(12) United States Patent
Henn et al.

(10) Patent No.: US 7,976,759 B2
(45) Date of Patent: Jul. 12, 2011

(54) SYSTEM AND METHOD FOR PRODUCING PARTICLES AND PATTERNED FILMS

(75) Inventors: Robert Henn, Raleigh, NC (US); Alex Ermoshkin, Chapel Hill, NC (US); Kyle Henn, Raleigh, NC (US); Benjamin Maynor, Durham, NC (US)

(73) Assignee: Liquidia Technologies, Inc., Durham, NC (US)

( * ) Notice: Subject to any disclaimer, the term of this patent is extended or adjusted under 35 U.S.C. 154(b) by 0 days.

(21) Appl. No.: 12/250,461

(22) Filed: Oct. 13, 2008

(65) Prior Publication Data

US 2009/0098380 A1    Apr. 16, 2009

Related U.S. Application Data

(60) Provisional application No. 60/979,710, filed on Oct. 12, 2007.

(51) Int. Cl.
B28B 5/00 (2006.01)
B28B 3/12 (2006.01)

(52) U.S. Cl. .................. 264/297.6; 264/297.8; 425/220; 425/362

(58) Field of Classification Search ........... 264/8, 297.6, 264/297.8; 425/220, 362
See application file for complete search history.

(56) References Cited

U.S. PATENT DOCUMENTS

| | | | |
|---|---|---|---|
| 4,050,873 A * | 9/1977 | Brumlik et al. | 425/371 |
| 5,213,588 A | 5/1993 | Wong et al. | |
| 6,512,063 B2 | 1/2003 | Tang | |
| 2001/0038803 A1 | 11/2001 | Morales et al. | |
| 2007/0275193 A1 | 11/2007 | DeSimone et al. | |

FOREIGN PATENT DOCUMENTS

| | | | |
|---|---|---|---|
| WO | WO2005084191 A2 | 9/2005 | |
| WO | WO 2005101466 A2 * | 10/2005 | |
| WO | WO2007021762 A2 | 2/2007 | |
| WO | WO2007030698 A2 | 3/2007 | |
| WO | WO2007094829 A2 | 8/2007 | |

OTHER PUBLICATIONS

Search Report from PCT/US2008/79746, filed Oct. 13, 2008.
West et al., "Polymeric Biomaterials with Degradation Sites for Proteases Involved in Cell Migration", Macromolecules, vol. 32, 1999, pp. 241-244.

* cited by examiner

*Primary Examiner* — Yogendra N Gupta
*Assistant Examiner* — Alison Hindenlang
(74) *Attorney, Agent, or Firm* — Morgan, Lewis & Bockius LLP

(57) ABSTRACT

A system including a mold having a fluoropolymer wherein the mold defines a plurality of cavities having a predetermined shape and a cross-sectional dimension less than about 100 micrometers; a roller; a surface in cooperation with the roller to form a nip point configured to receive the mold, wherein the nip point is further configured to receive a substantially liquid composition and accelerate entry of the substantially liquid composition into the cavity. A method of forming particles including applying a substantially liquid composition to a mold, wherein the mold comprises a fluoropolymer and defines a plurality of cavities each having a broadest cross-sectional dimension of less than about 100 micrometers; nipping the mold between a roller and a surface such that the substantially liquid composition enters the cavities of the mold; and hardening the substantially liquid composition in the cavities of the mold to form a particle within each cavity, wherein the particle has a size and shape that substantially mimics the size and shape of the cavity of the mold.

17 Claims, 16 Drawing Sheets

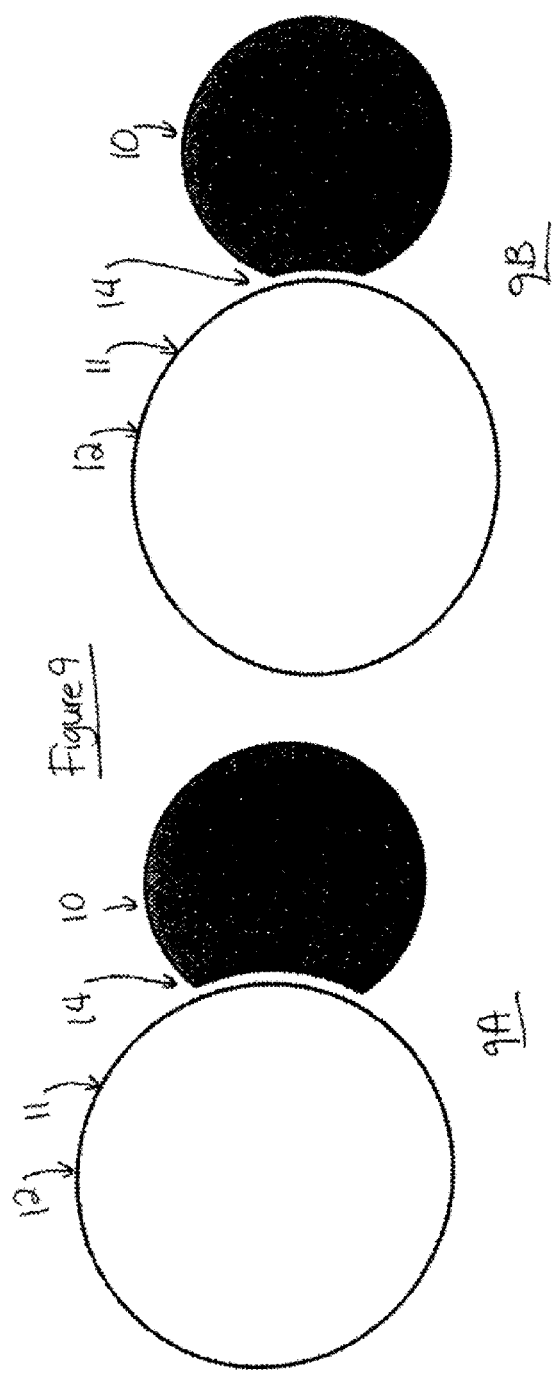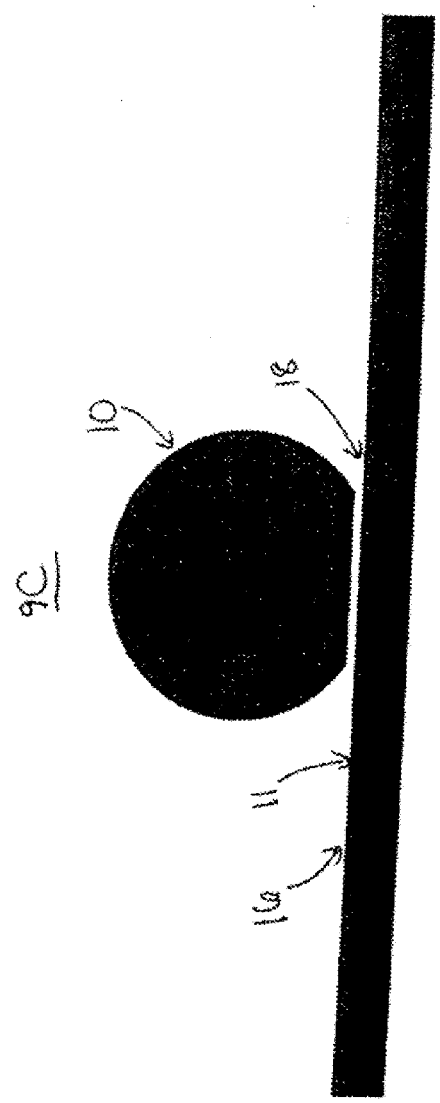
Figure 9

Figure 13
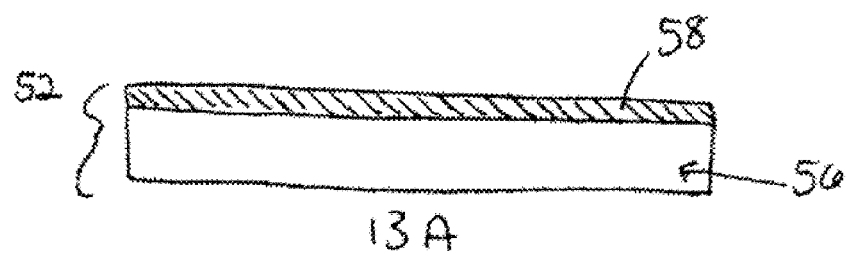
13A
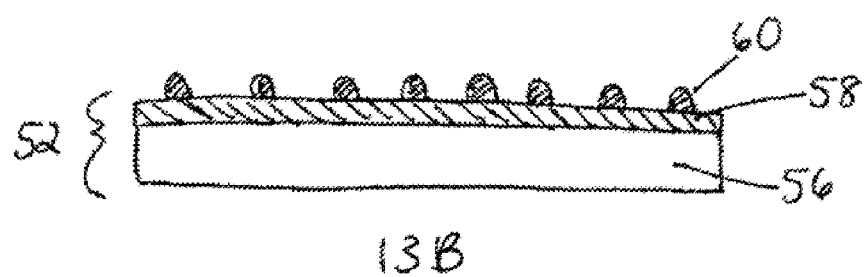
13B
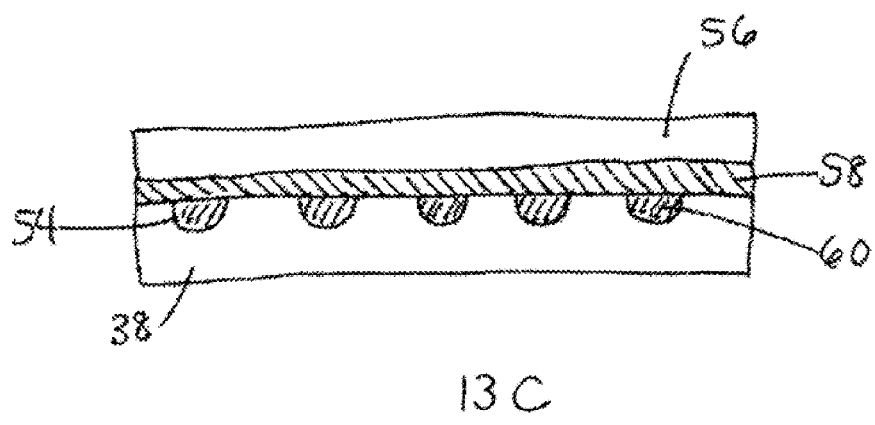
13C

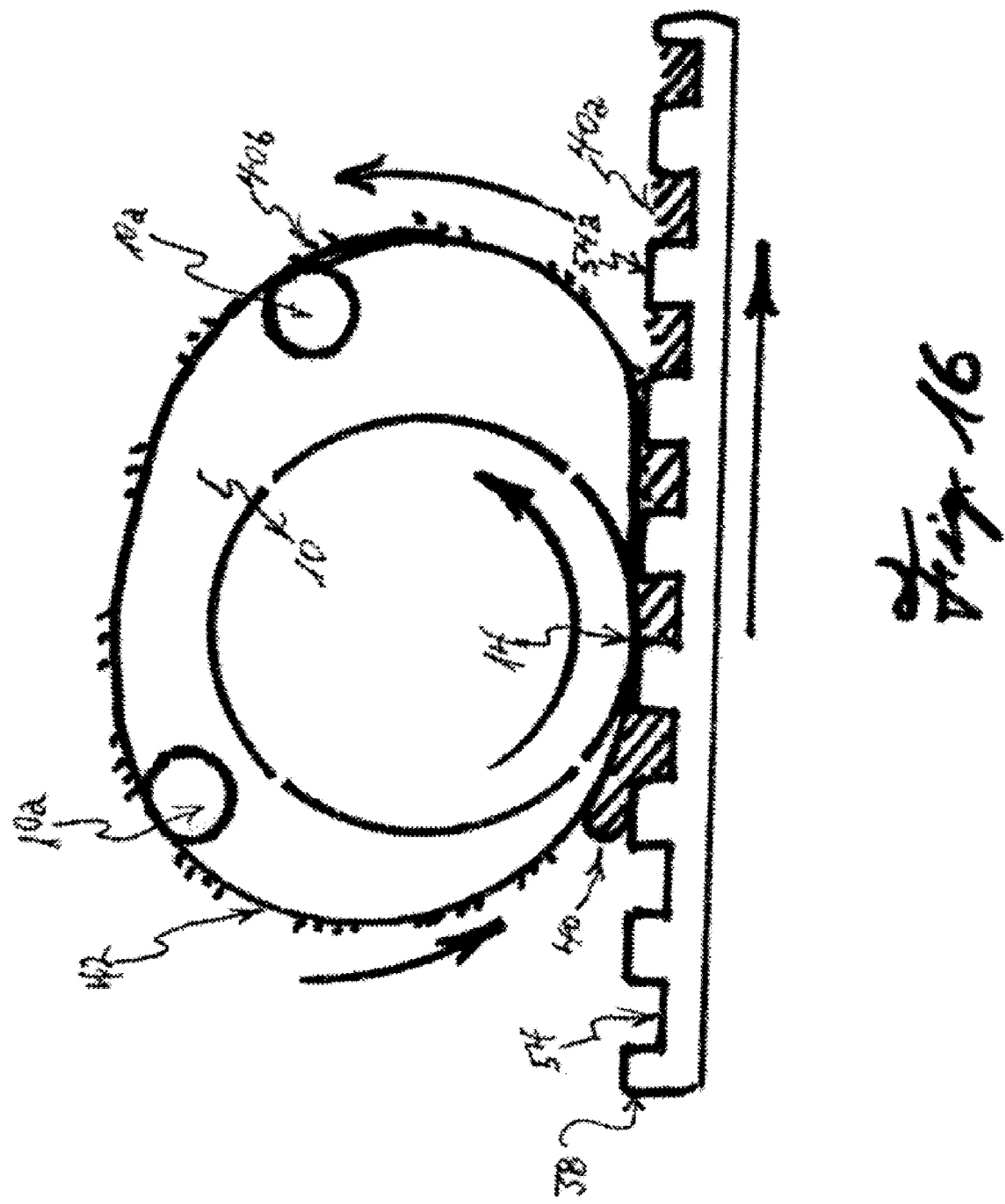

SYSTEM AND METHOD FOR PRODUCING PARTICLES AND PATTERNED FILMS

RELATED APPLICATIONS

This application claims priority to U.S. Provisional Patent Application 60/979,710, filed Oct. 12, 2007, which is herein incorporated by reference in its entirety.

BACKGROUND

Nanotechnology is a fast growing industry with many potential implications on products ranging from lenses configured to manipulate light to pharmaceuticals and drug delivery devices. Nanostructured lenses can include lenses designed with nanometer scale structures ordered and arranged to polarize or focus light. In other applications, nanometer sized particles can be fabricated of engineered polymer compositions designed to package and deliver pharmaceutical or biologic material to desired tissues or organs within a patient.

Nanotechnology based products, however, face unique hurdles in manufacturing because the products include structures or components that have a size or shape on the nanometer scale. In other words, although nanotechnology is a rapidly growing industry with many potential applications, the ability to fabricate nanometer scale products in volume needs advancement.

Currently, products of or having nanometer size structures are fabricated in batch type processing. Many of these batch processes require high precision machinery with the capability of maintaining very level surfaces, typically relying on glass substrate components. In certain instances, these processes can fabricate effective components; however, the processes typically fail to produce the yield that is required for mass production. Therefore, a need exists to transform the fabrication of nanometer scale products and components from batch type processes to robust and dynamic roll to roll processing.

BRIEF DESCRIPTION OF THE DRAWINGS

Reference is made to the accompanying drawings which show illustrative embodiments of the present invention and which should be read in connection with the description of the invention.

FIGS. 9A-9C show configurations with varying nip point contact areas.

FIGS. 13A-13C show configurations for harvesting particles. FIG. 13A shows a laminate treated with a soluble substance. FIG. 13B shows particles adhered to a soluble substance on a laminate. FIG. 13C shows particles contained within mold cavities and in contact with a soluble substance.

FIG. 16 shows a configuration of a system in which a cover film and a mold are combined at a nip point.

SUMMARY OF EMBODIMENTS OF THE INVENTION

Figure 1:
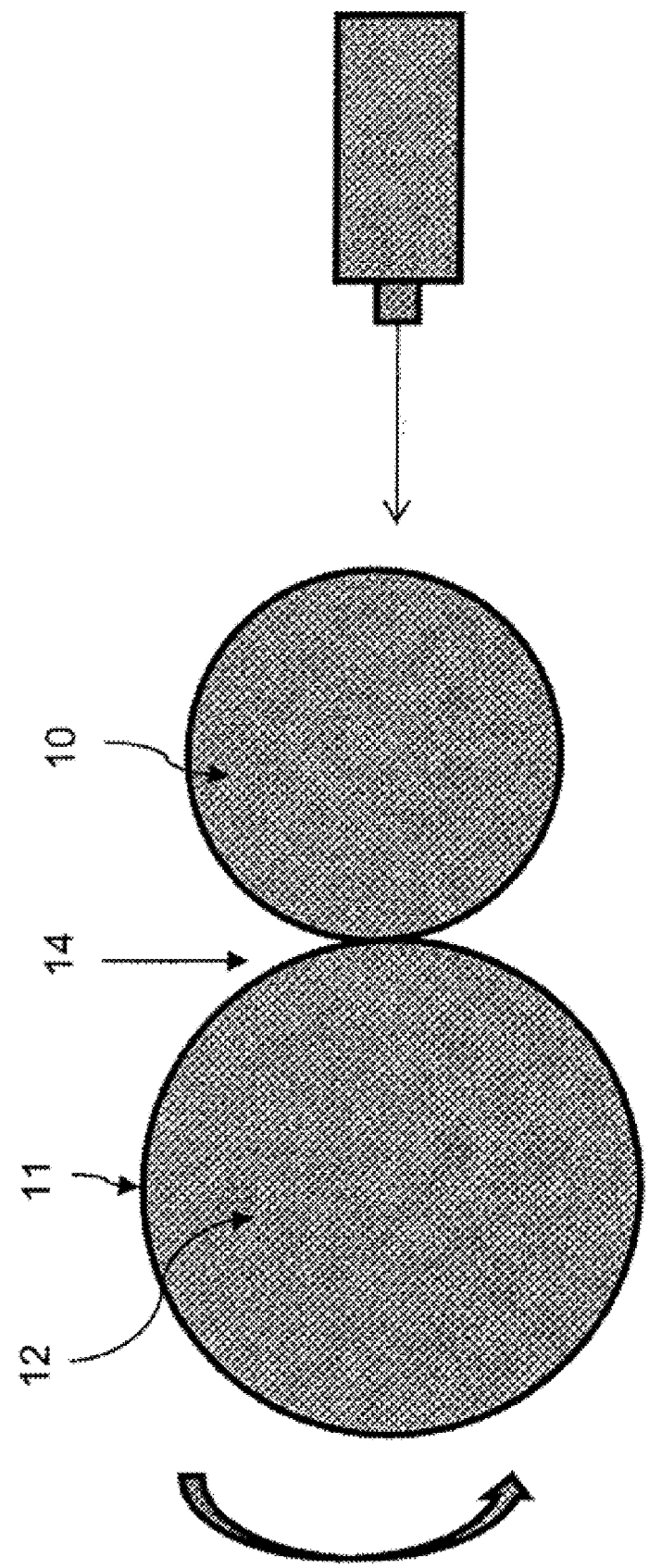
FIG. 1 shows a configuration of two rollers forming a nip point.

According to some embodiments of the present invention, a method of forming nanoparticles comprises applying a substantially liquid composition to a mold, wherein the mold comprises a polymer and defines a plurality of cavities each having a broadest cross-sectional dimension of less than about 100 micrometers; passing the mold through a nip point such that the substantially liquid composition enters the cavities of the mold; and hardening the substantially liquid composition in the cavities of the mold to form a particle within each cavity, wherein the particle has a size and shape that substantially mimics the size and shape of the cavity of the mold.

In some embodiments, passing the mold through a nip point further comprises nipping the substantially liquid composition between a cover sheet and the mold. In some embodiments, a method of forming nanoparticles further comprises, before hardening, removing the cover sheet from the mold wherein the cavities remain filled with the substantially liquid composition and land area of the mold between the cavities is substantially free from the liquid composition. In certain embodiments, the substantially liquid composition not contained in the cavities substantially remains in contact with the cover sheet upon removal of the cover sheet from the mold.

In some embodiments, a method of forming nanoparticles includes, after hardening, harvesting the particles from the mold. In certain embodiments, before hardening, the mold is nipped with a substrate to laminate the substrate to the mold. In some embodiments, after nipping the mold with the substrate, the method includes hardening the substantially liquid compositions and harvesting the particle from the mold, wherein the harvesting includes separating the substrate from the mold such that the substrate moves away from the mold with the particles disposed on the substrate. In some embodiments, the substrate is removed from the mold at a predetermined angle.

In some embodiments of the present invention, the polymer mold comprises a fluoropolymer. In some embodiments, the polymer mold comprises a fluoropolyether.

According to some embodiments, a method for harvesting particles includes passing a base substrate and an array of nanoparticles coupled therewith through a nip point; applying a solvent proximate to the nip point, wherein the solvent is capable of disengaging the particles from the base substrate and dispersed the particles into a solution; and collecting the solution. In certain embodiments, the substrate includes a surface treated with a soluble substance. In some embodiments, the solvent dissolves the soluble substance to release the particles into the solution.

According to some embodiments of the present invention, a system for making nanoparticles comprises a mold comprising a polymer, wherein the mold defines a plurality of cavities and each cavity has a predetermined shape and a cross-sectional dimension less than about 100 micrometers; a dispenser for dispensing a deformable composition near the nip point or on a substrate; and a nip point configured to receive the mold and substrate with the deformable composition dispensed there between and nip the mold and substrate together and urge the deformable composition into the cavities of the mold. In some embodiments, a system further comprises a curing device operable to harden the deformable composition in the cavities of the mold to form a particle that substantially mimics the shape and size of the cavity. In some embodiments, a system further comprises a second nip point configured to receive a base substrate having the particles coupled therewith; and a solvent associated with the second nip point wherein the solvent disassociates the particles from contact with the base substrate.

According to some embodiments, a method of forming a structured film includes applying a deformable composition to a mold, wherein the mold comprises a polymer and defines a plurality of cavities having a cross-sectional dimension of less than about 100 micrometers; laminating the mold with a first film in a nip point such that a portion of the deformable composition enters the cavities of the mold and excess deformable composition remains between the mold and the first film; and hardening the deformable composition, wherein the hardened composition forms a patterned film having structures that substantially mimic the size and shape of the cavities. In some embodiments, a method of forming a structured film further includes controlling thickness of the excess deformable composition such that an overall thickness of the structured film is obtained. In some embodiments, the polymer comprises a perfluoropolyether.

According to some embodiments of the present invention, a collection of nanoparticles is made by a process comprising nipping a deformable composition between a cover sheet and a polymer mold, wherein the mold defines cavities having a cross-sectional dimension of less than about 100 micrometers; separating the cover sheet from the mold after nipping the deformable composition between the mold and cover sheet such that the cavities remain filled with the deformable composition and area on the mold between the cavities is substantially free from deformable composition; hardening the deformable composition in the cavities such that nanoparticles are formed that substantially mimic size and shape of the cavities of the mold; and removing the nanoparticles from the cavities of the mold.

DETAILED DESCRIPTION OF EMBODIMENTS OF THE INVENTION

According to some embodiments, the present invention includes methods and systems for forming micro and/or nanosized particles and/or patterned films and/or harvesting the particles. In some embodiments, a system of the present invention includes a mold comprising a fluoropolymer and/or having a surface energy less than about 18 mN/m. The mold may define a surface having a plurality of cavities, each cavity having a predetermined shape and a cross-sectional dimension less of than about 100 micrometers. In some embodiments, the system includes a roller and a surface in cooperation with the roller to form a nip point. The nip point may be configured to receive the mold or the mold and a backing or film layer. In some embodiments, the nip point is configured to accelerate the filling of the cavities. In some embodiments the nip point is configured to hold a bead of substantially liquid composition and accelerate entry of the substantially liquid composition into the cavities.

In some embodiments, a system of the present invention produces micro and/or nanosized particles. In some embodiments, a method of forming particles includes applying a substantially liquid composition to a mold and progressing the mold through a nip point in a continuous or batch process. In some embodiments, the mold may include a fluoropolymer and may define a plurality of cavities having a broadest cross-sectional dimension of less than about 100 micrometers. In some embodiments, the mold is nipped between a roller and a surface such that the substantially liquid composition enters the cavities of the mold. The substantially liquid composition may be hardened in the cavities of the mold to form a particle within each cavity. In some embodiments, the particle has a size and shape that substantially mimics the size and shape of the cavity of the mold.

In some embodiments a system of the present invention harvests particles. In some embodiments, a method for harvesting particles includes forming a covered mold with a film, where the film may have a side which is coated with a soluble substance which has an affinity of the particles. When the film is separated from the mold face (i.e., open cavity side), particles adhered to the coating are removed from the mold cavities. The coated film with the adhered particles may be fed between a nip point holding a bead of solvent for the coating. The particle covered cover film is presented to the nip with the particles and coating face proximate to the solvent bead. In some embodiments the solvent is capable of dissolving the soluble coating and thereby releasing the particle into the solution of coating and solvent. In some embodiments the soluble coating is dissolved such that the particle is released from the film creating a dispersion of particle in a solution of solvent and soluble coating. The dispersion of particles in solution may then be collected.

In some embodiments, a system of the present invention forms a structured film. A substantially liquid composition may be applied to a mold and progressed through a nip point. In some embodiments, a first film and the mold may be combined or laminated between a roller and a surface such that the substantially liquid composition enters the cavities of the mold. In some embodiments, the mold, liquid and first film are treated such that the substantially liquid composition in the cavities of the mold hardens and adheres to the first film. In some embodiments, the mold is removed from the first film such that the hardened composition is removed from the mold and remains on the first film thereby forming a patterned film having structures that substantially mimic the size and shape of the cavities of the mold.

In some embodiments a first cover film and the mold may be combined at a nip point such that the substantially liquid composition enters the cavities of the mold and is covered by the first cover film. In some embodiments, prior to entering the nip point, the substantially liquid composition can be applied to the mold, the first cover film, as a bead at the nip point, or combinations thereof. In some embodiments, the first cover film is removed such that the substantially liquid composition not in the cavities of the mold remains adhered to the first cover film and not the mold surface. In these embodiments, the micro or nano cavities remain substantially filled by the substantially liquid composition. In some embodiments, the mold surface having the cavities or mold face may be combined with a second cover film and treated such that the substantially liquid composition in the cavities is hardened and adheres to the second cover film. In some embodiments, when the second cover film is separated from the mold surface having cavities thereon, hardened composition from the cavities remain adhered to the second cover film and are removed from the cavities, thereby forming a patterned film having the hardened composition as structures that substantially mimic the size and shape of the cavities of the mold.

In some embodiments a first cover film and the mold may be combined at a nip point such that the substantially liquid composition enters the cavities of the mold and is covered by the first cover film. In some embodiments, prior to entering the nip point, the substantially liquid composition can be applied to the mold, the first cover film, as a bead at the nip point, or combinations thereof. In some embodiments, the first cover film is removed such that the substantially liquid composition not in the cavities of the mold remains adhered to the first cover film and not the mold surface. In these embodiments, the micro or nano cavities remain substantially filled by the substantially liquid composition. In some embodiments, the liquid composition contained in the cavities can be hardened or cured. After hardening, the hardened composition can be removed to provide isolated discrete micro or nanoparticles having a size and shape that substantially mimic the size and shape of the cavities.

In some embodiments, as shown in FIG. 16, a first cover film 42 and mold 38 may be combined at a nip point 14 such that the substantially liquid composition 40 enters the cavities 54 of mold 38 and is covered by the first cover film. In some embodiments, prior to entering the nip point 14, the substantially liquid composition 40 can be applied to the mold, the first cover film, as a bead at the nip point, or combinations thereof. In some embodiments, the first cover film is removed such that the substantially liquid composition 40b not in the cavities of the mold remains adhered to the first cover film 42 and not the mold surface 54a. In these embodiments, the micro or nano cavities 54 remain substantially filled with the substantially liquid composition 40a. The first cover film 42 is substantially looped around roller 10. In some embodiments, the loop of first cover film 42 is looped around guide rollers 10a to prevent contact with roll 10 and to give a closed loop of first cover film 42 entering and exiting nip point 14.

Some embodiments of the present invention provide systems and methods for fabricating a patterned film of a single composition. According to such embodiments, a liquid composition is presented between a mold surface having micro and/or nanosized cavities and a first cover film and progressed through a nip point. In some embodiments, the liquid composition presented between the mold surface and first cover film is in excess of a quantity necessary to fill the cavities, as such both filling the cavities and creating a substantially continuous film between the first cover film and the mold surface. In some embodiments, the cover film and the surface film are positioned and/or maintained at a fixed gap such that a substantially continuous film of liquid composition is achieved. Next, the liquid composition presented between the mold and first cover film is treated, cured, hardened, or the like. The mold and first cover film can be separated from the hardened single composition yielding a single composition patterned film. The patterned film can include a continuous or integral layer having surface structures on a surface that substantially mimic the size and shape of the cavities of the mold. According to some embodiments, the size, shape, spacing, orientation, or the like of the cavities of the mold can be selected to yield a useful product. Such useful products can include a patterned film surface that manipulates light, by but not limited to, selected polarization, selected reflectance, selected focusing, selected distribution, combinations thereof, and the like.

Components of the System

Roller

In some embodiments, the system may include a roller or multiple rollers. In some embodiments, the rollers can be cylindrically shaped. In some embodiments, the roller is configured within the system to rotate about a central axis. In some embodiments, the rotation of the roller is controlled by a motor. In some embodiments, the linear velocity of the surface of the roller is equivalent to a roller speed of about 0 ft/min to about 25 ft/min. In some embodiments, the roller turns at a speed of about 1 ft/min to about 24 ft/min. In some embodiments, the roller turns at a speed of about 2 ft/min to about 23 ft/min. In some embodiments, the roller turns at a speed of about 3 ft/min to about 22 ft/min. In some embodiments, the roller turns at a speed of about 4 ft/min to about 21 ft/min. In some embodiments, the roller turns at a speed of about 5 ft/min to about 20 ft/min. In some embodiments, the roller turns at a speed of about 6 ft/min to about 19 ft/min. In some embodiments, the roller turns at a speed of about 7 ft/min to about 18 ft/min. In some embodiments, the roller turns at a speed of about 9 ft/min to about 17 ft/min. In some embodiments, the roller turns at a speed of about 10 ft/min to about 16 ft/min. In some embodiments, the roller turns at a speed of about 11 ft/min to about 15 ft/min. In some embodiments, the roller turns at a speed of about 12 ft/min to about 14 ft/min. In some embodiments, the roller turns at a speed of about 13 ft/min.

In some embodiments, the roller may include an elastic material and/or a plastic material. In one embodiment, the roller includes an elastic hydrocarbon polymer, or a rubber material. In certain embodiments, an elastic roller may have a durometer hardness of about 20 A to about 100 A. In other embodiments, an elastic roller may have a durometer hardness of about 40 A to about 80 A. In some embodiments, roller hardness is in the scale of OO (e.g., foam sponge), O (e.g., extra soft rubber), A (e.g., silicone rubber), D (e.g., plastics), combinations thereof or the like.

In some embodiments, the roller may include an inelastic material. In some embodiments, the roller may include steel, stainless steel, aluminum, titanium, copper, a precious metals coating, rubber, a rubber coating, a polymer, combinations thereof or the like. In some embodiments, the rollers may have selected surface energies, high surface energies, low surface energies, and surface energies to affect a continuous coating or desired de-wetting.

The rollers can have a diameter selected according to the size of molds, particles, patterned films, or the like to be fabricated on or with the system or according to parameters such as speeds, tension, temperature, or the like to be used in the system. In other embodiments, the roller may have a diameter of about 5 mm to about 60 mm. In some embodiments, the roller has a diameter of about 10 mm to about 40 mm. In other embodiments, the roller has a diameter of about 20 mm to about 30 mm.

In some embodiments the roller may be heated or cooled. The roller may be heated or cooled by any suitable method, such as electricity, fluid, convection or conduction.

In some embodiments, the system may include one or more rollers.

Plate

In some embodiments, the system includes a plate for receiving molds, masters, harvesting layers, or the like. In certain embodiments, the plate includes a substantially planar surface and can be movable or adjustable with three or more degrees of freedom.

In some embodiments, the plate is resistant to warping under pressure. In some embodiments, the plate is resistant to warping under high temperatures. According to some embodiments, the plate conducts heat, includes a heater, includes a cooler, is passively or actively (by a motor) linearly actuated, is adjustable with respect to a roller, combinations thereof, or the like.

In some embodiments, the plate-includes aluminum. According to some embodiments, the plate includes stainless steel, coated with precious metals, titanium, ceramic, polymeric materials, glass and the like.

In certain embodiments, the plate is heated. The plate may be heated by any suitable method, including electricity, fluid, convection, or conduction. In some embodiments, the plate contains heating elements. The plate may also be heated by placing the plate on a separate heating element.

Nip Point

Figure 2:
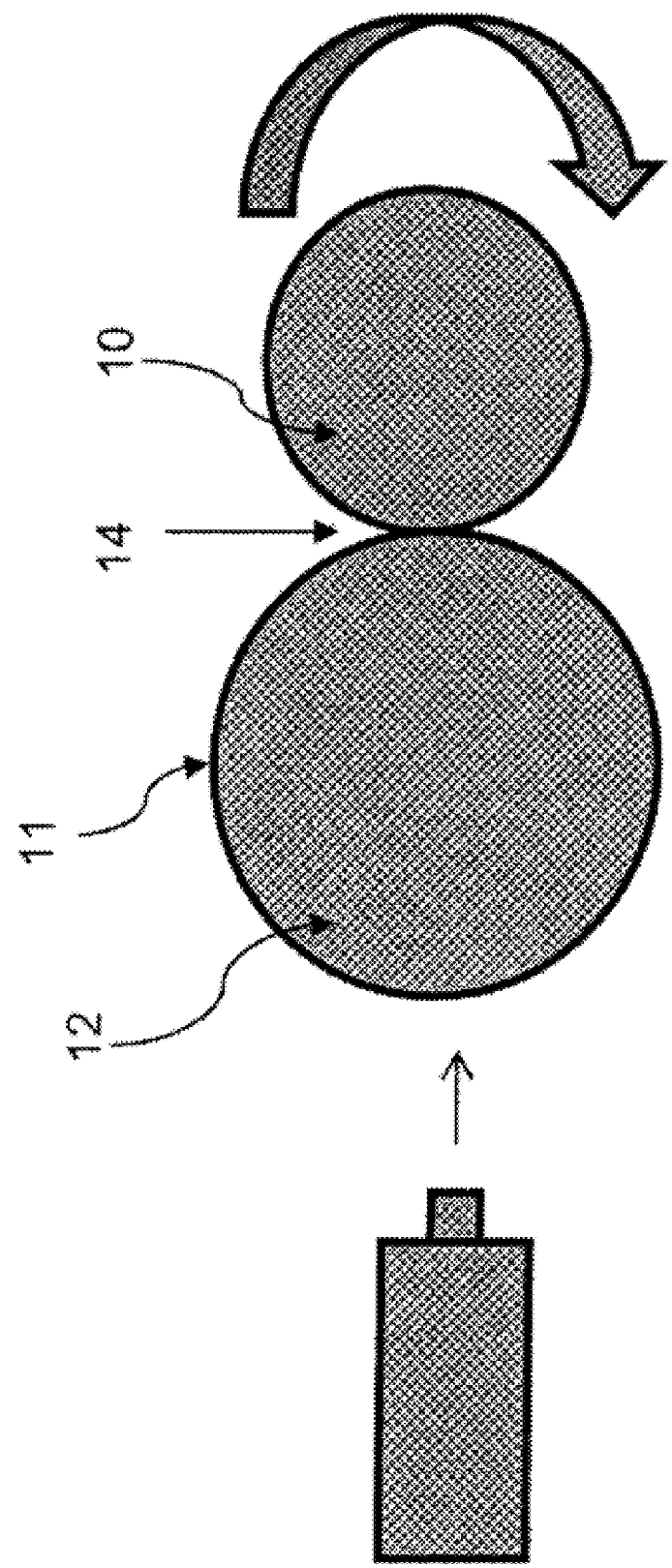
FIG. 2 shows a configuration of two rollers forming a nip point.
Figure 3:
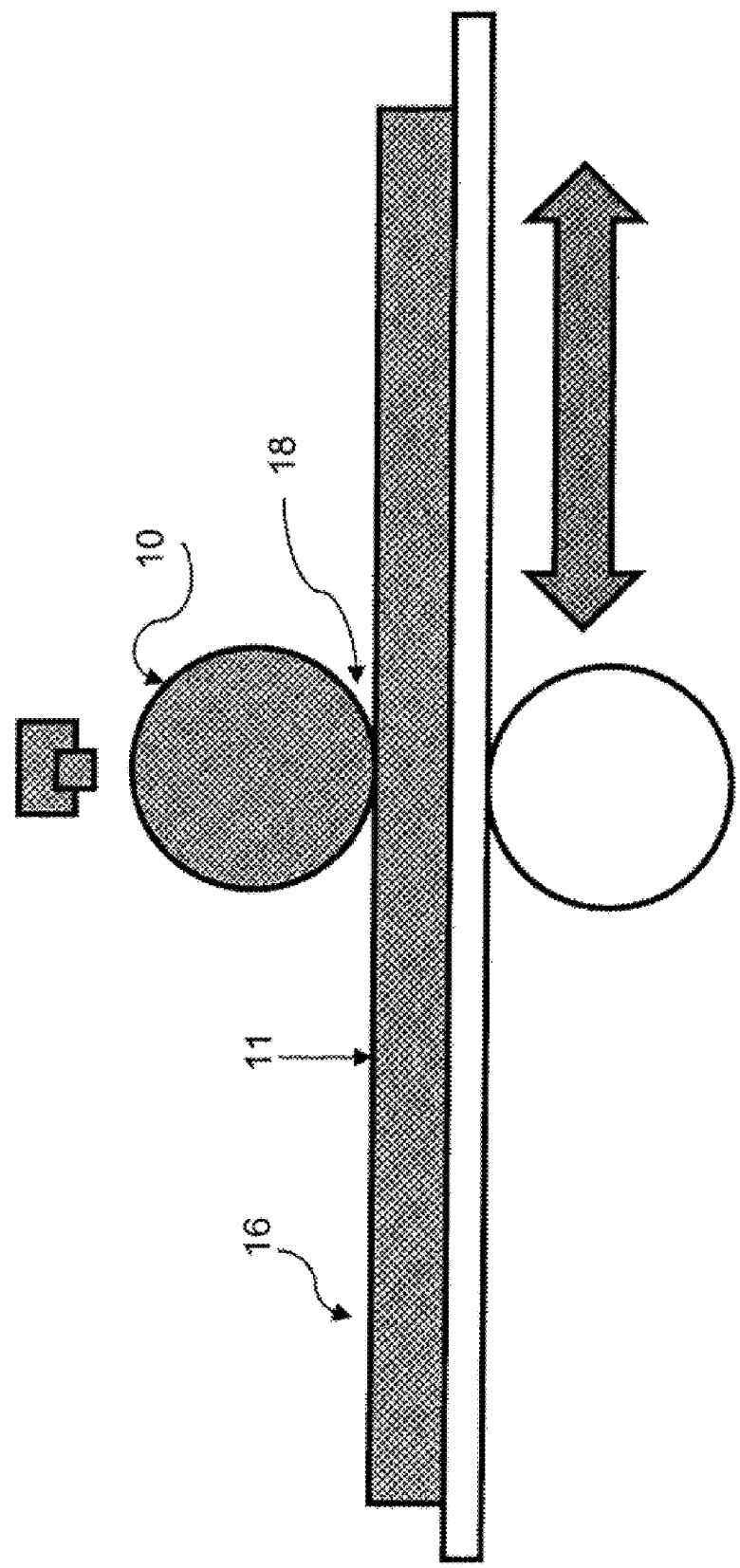
FIG. 3 shows a configuration of a roller and a surface of a plate forming a nip point.

In some embodiments, the system includes at least one nip point. According to some embodiments, a nip point is formed between a surface in cooperation with a roller. Referring to FIGS. 1 and 2, in some embodiments surface 11 is the surface of second roller 12, such that nip point 14 is formed between roller 10 and second roller 12. Referring to FIG. 3, in other embodiments surface 11 is the surface of plate 16, such that nip point 18 is formed by roller 10 and plate 16. In alternative embodiments one roller is reversibly driven with a motor, both rollers are reversibly driven by a single or independent motors, one or more roller is freely rotatable and/or not driven, combinations thereof, or the like.

According to some embodiments, roller 10 and surface 11 are positioned relative to each other to form desired nip point, 14, 18. In some embodiments, the position of roller 10 may be adjusted relative to plate 16. In some embodiments, the position of plate 16 may be adjusted relative to roller 10. In some embodiments, roller 10 and a surface are positioned to produce a desired pressure at nip point 14, 18. The position of roller 10 may be controlled by piston 20, 22. In some embodiments, pistons 20, 22 are air actuated pistons.

Figure 4:
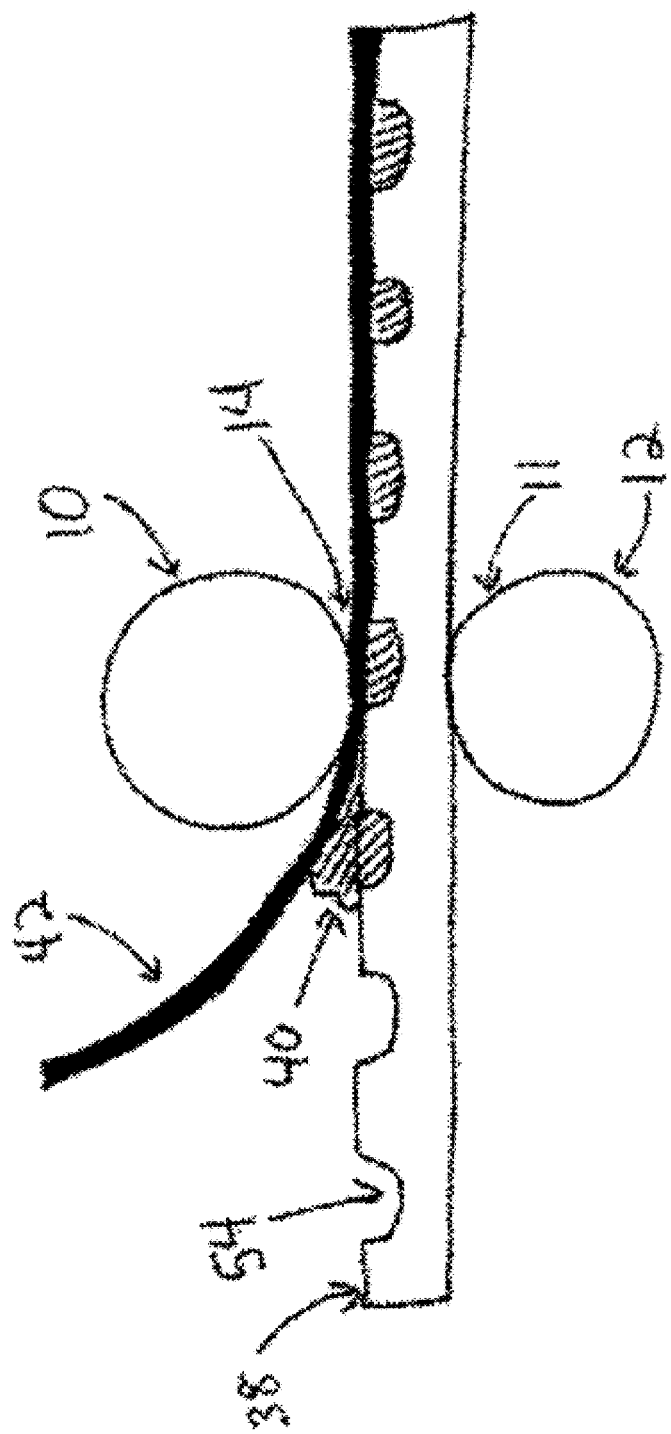
FIG. 4 shows a nip point configured to receive a mold.

Referring to FIG. 4, in some embodiments, nip point 14, 18 is configured to receive mold 38. In some embodiments, roller 10 and surface 11 are positioned such that mold 38 may pass between them. Nip point 14, 18 may also be configured to receive substantially liquid composition 40. In certain embodiments, the nip point 14, 18 is configured to accelerate the filling of the cavities at the nip point 14, 18 and urge the substantially liquid composition into cavities or recessions 54 of mold 38. In some embodiments, nip point 14, 18 is configured to receive an additional material such as substrate 42.

In some embodiments, roller 10 and surface 11 are positioned such that pressure is applied to mold 38 and/or the liquid composition and/or any additional materials at the nip point. In some embodiments, roller 10 and surface 11 are controlled such that a predetermined amount of pressure is applied to mold 38 and/or the liquid composition and/or any additional materials at the nip point. According to some embodiments, the pressure at the nip point is controlled by adjusting the position of roller 10 and surface 11 relative to each other. In certain embodiments, the pressure is determined by the viscosity, hydrophilic/hydrophobic nature of the materials, surface tension of the liquid, surface energy of the rollers, surface energy of the films, surface energy of the molds, or the like. In some embodiments, about 0 psi to about 100 psi is applied at nip point 14, 18. In some embodiments, about 5 psi to about 95 psi is applied at nip point 14, 18. In certain embodiments, about 10 psi to about 90 psi is applied at nip point 14, 18. In some embodiments, about 15 psi to about 85 psi is applied at nip point 14, 18. In some embodiments, about 20 psi to about 80 psi is applied at nip point 14, 18. In some embodiments, about 25 psi to about 75 psi is applied at nip point 14, 18. In some embodiments, about 30 psi to about 70 psi is applied at nip point 14, IS. In some embodiments, about 35 psi to about 65 psi is applied at nip point 14, 18. In some embodiments, about 40 psi to about 60 psi is applied at nip point 14, 18. In some embodiments, about 45 psi to about 55 psi is applied at nip point 14, 18. In some embodiments, about 50 psi is applied at nip point 14, 18. According to some embodiments, an amount of pressure is applied at the nip point to accelerate entry of the substantially liquid composition 40 into mold 38.

In some embodiments, plate 16 is configured to move linearly through a nip point. In some embodiments, plate 16 includes grooves or tracks to guide movement of plate 16 through the nip point. In some embodiments, the movement of plate 16 is controlled by a motor. In some embodiments the roller and/or plate motor is controlled by an electronic control unit that can be controlled by input of an end user or preprogrammed to control the plate based on a set of parameters that include, but are not limited to, viscosity of the materials to be molded, processing times that are based on the characteristics of the materials to be molded, starting materials, temperature, combinations thereof, and the like. In some embodiments, plate 16 moves at a speed of about 0 to about 25 ft/min. In some embodiments, plate 16 moves at a speed of about 1 to about 15 ft/min. In other embodiments, plate 16 moves at a speed of about 3 to about 12 ft/min.

Figure 5:
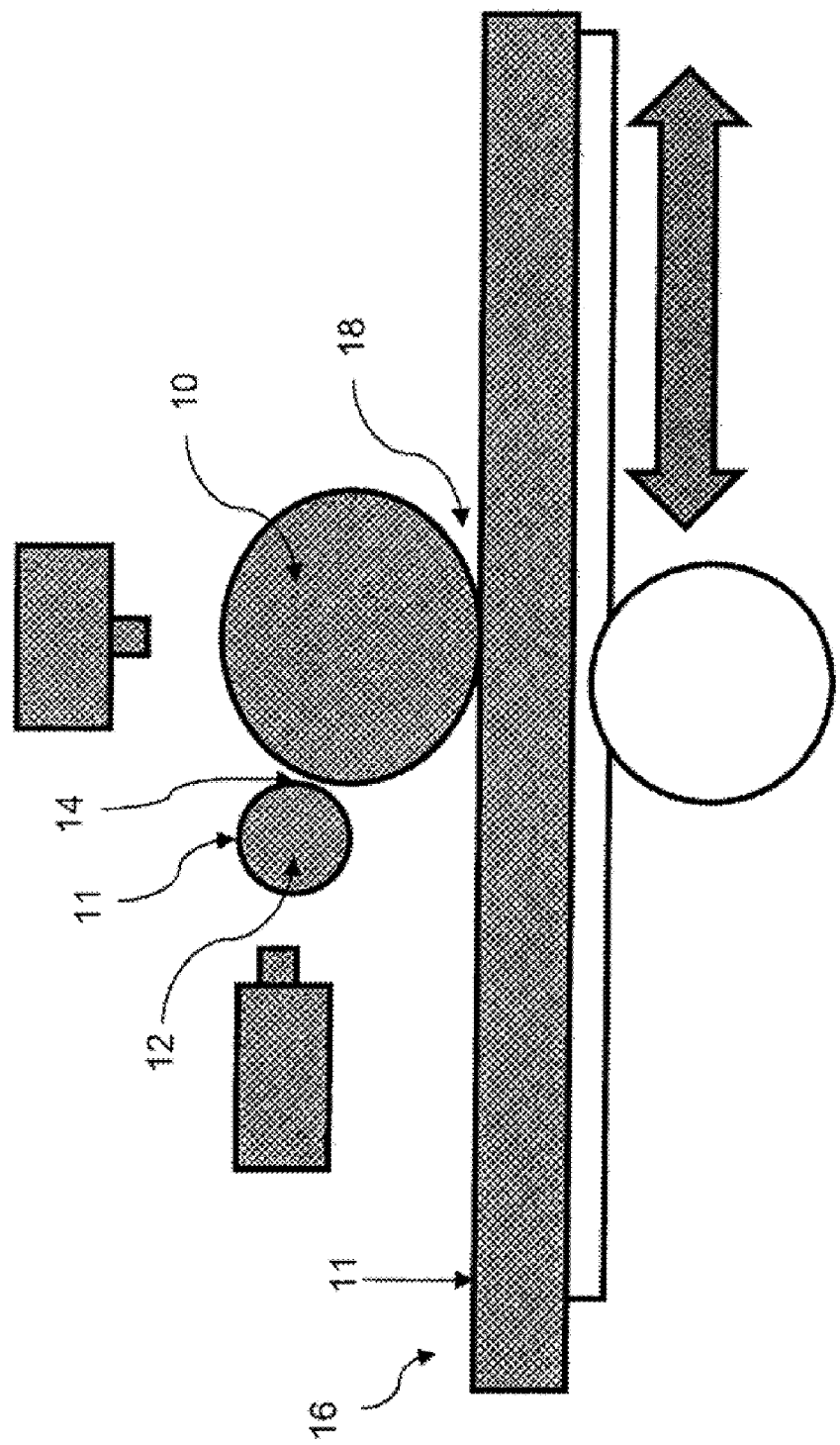
FIG. 5 shows a system including more than one nip point.

Referring to FIG. 5, according to some embodiments, a system includes more than one nip point 14, 18. In some embodiments, first nip point 14 is formed by roller 10 and a surface of second roller 12. In some embodiments, second roller 12 includes a substance which does not adhere to substantially liquid composition 40 described herein. In some embodiments, the substance includes PTFE and/or PE. In certain embodiments, second nip point 18 is formed by roller 10 and the surface of plate 16.

Figure 6:
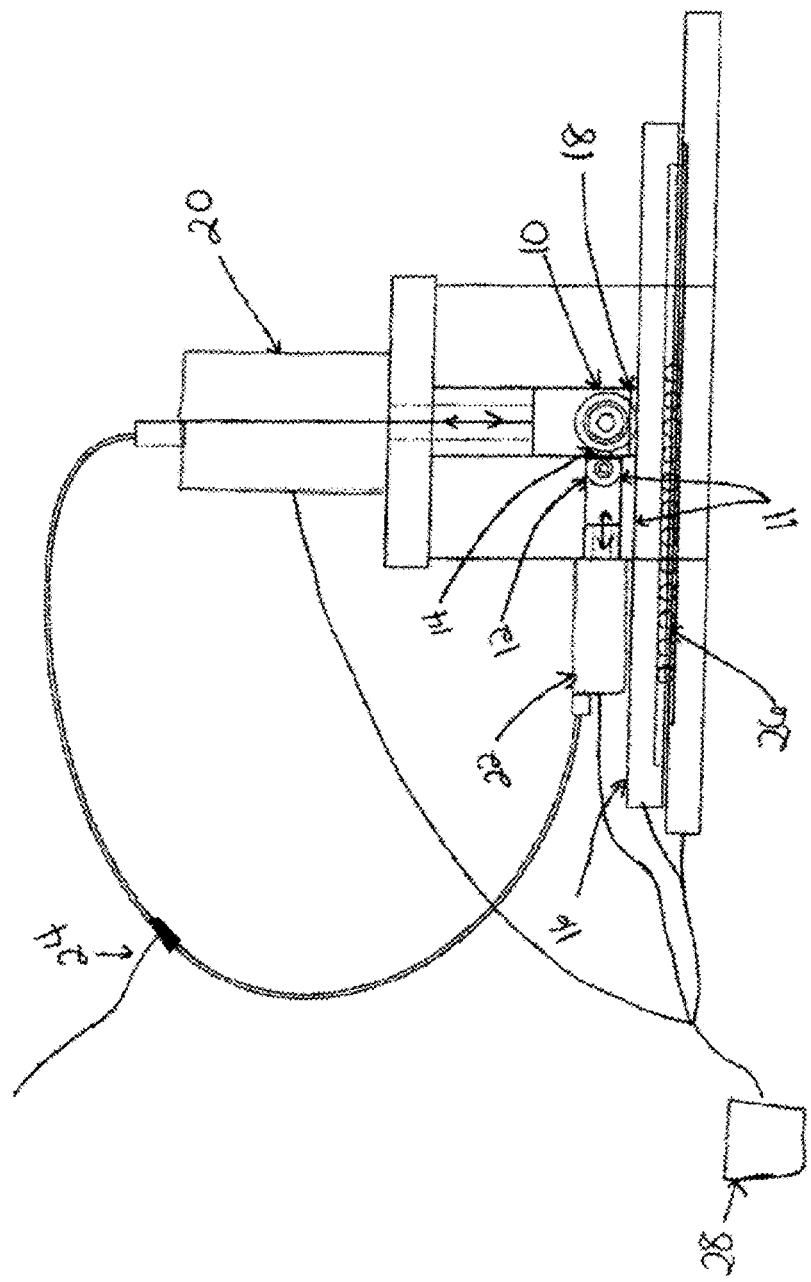
FIG. 6 shows a diagram of a system of some embodiments of the present invention.
Figure 7:
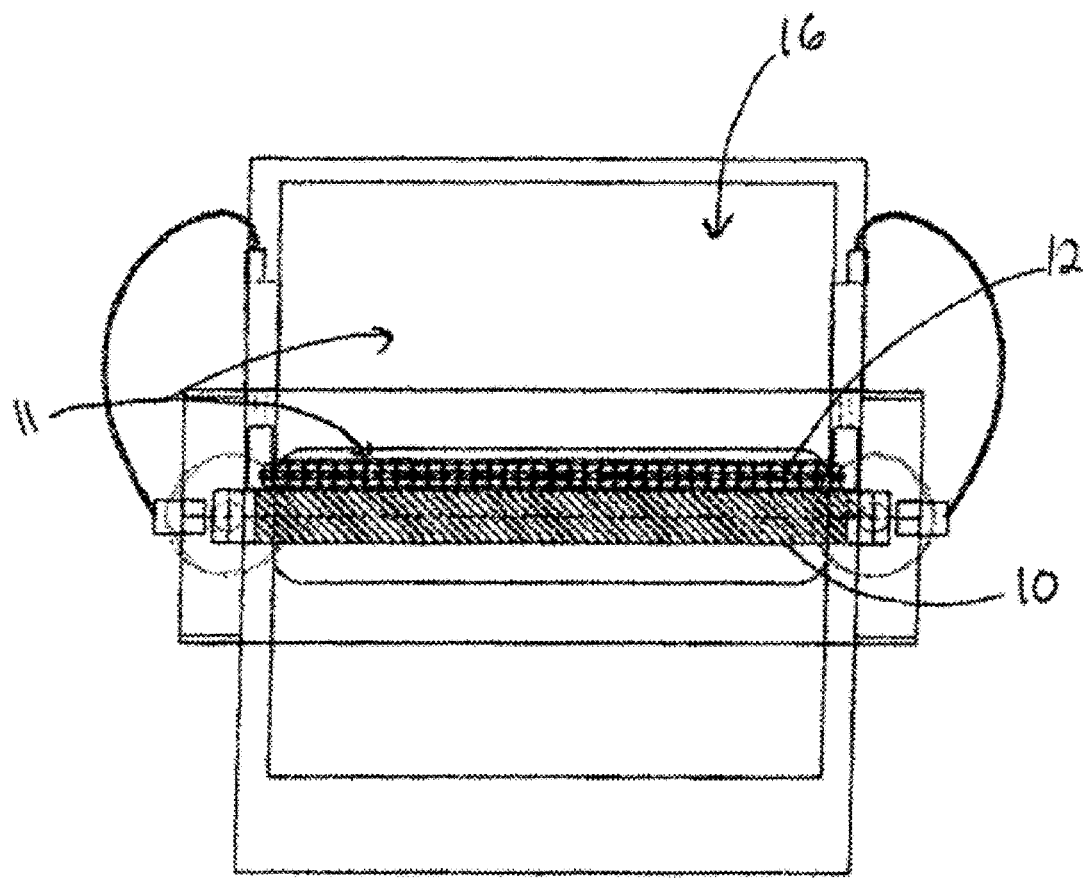
FIG. 7 shows a diagram of a system of some embodiments of the present invention.

Referring to FIGS. 6 and 7, a system of some embodiments may include nip point 14 formed by roller 10 and surface 11 of second roller 12. In some embodiments, roller 10 is larger in diameter than second roller 12. In other embodiments, roller 10 is the same size as or is smaller in diameter than second roller 12. In certain embodiments, the position of roller 10 is vertically adjustable. The position of roller 10 may be controlled by piston 20. In some embodiments, second roller 12 may be horizontally adjustable. The position of second roller 12 may be controlled by piston 22. Pistons 20, 22 may be attached to pressure line 24. Second roller 12 may be adjusted horizontally to a desired position relative to roller 10, to form nip point 14 in a desired configuration and/or pressure. In some embodiments, a system may include plate 16. Second nip point 18 may be formed by roller 10 and a surface of plate 16. In some embodiments, roller 10 may be adjusted vertically to a desired position relative to plate 16 to form second nip point 18. In certain embodiments, plate 16 moves horizontally. Plate 16 may include tracks or grooves 26 to guide the horizontal, linear movement. In some embodiments, the length of plate 16 may move linearly through second nip 18 point formed by the surface of plate 16 and roller 10. In some embodiments, at least one of roller 10, second roller 12, and/or plate 16 are heated.

In some embodiments, roller 10, second roller 12, and/or plate 16 may be heated by any suitable method, including electricity, fluid, convection, or conduction. In some embodiments, the plate contains heating elements. In certain embodiments, the system includes electronic control unit 28. Unit 28 may control various parameters of the system, including pistons 20, 22, pressure, speed, and temperature of the components of the system. Electronic control unit 28 may be connected with a user interface. In some embodiments, electronic control unit 28 controls the system based upon settings selected specifically for the materials to be used and/or fabricated with the system. In some embodiments, the system includes a port for applying substantially liquid composition 40 to mold 38. In some embodiments, the port may include a dropper. In some embodiments, an inkjet type system can be used to add the substantially liquid composition 40 to mold 38 in precise quantities. An inkjet type system may be used to fill molds with natural dewetting. In some embodiments, a pumping mechanism is used to add and remove solvent and/or substantially liquid composition 40 to the system.

Figure 8:
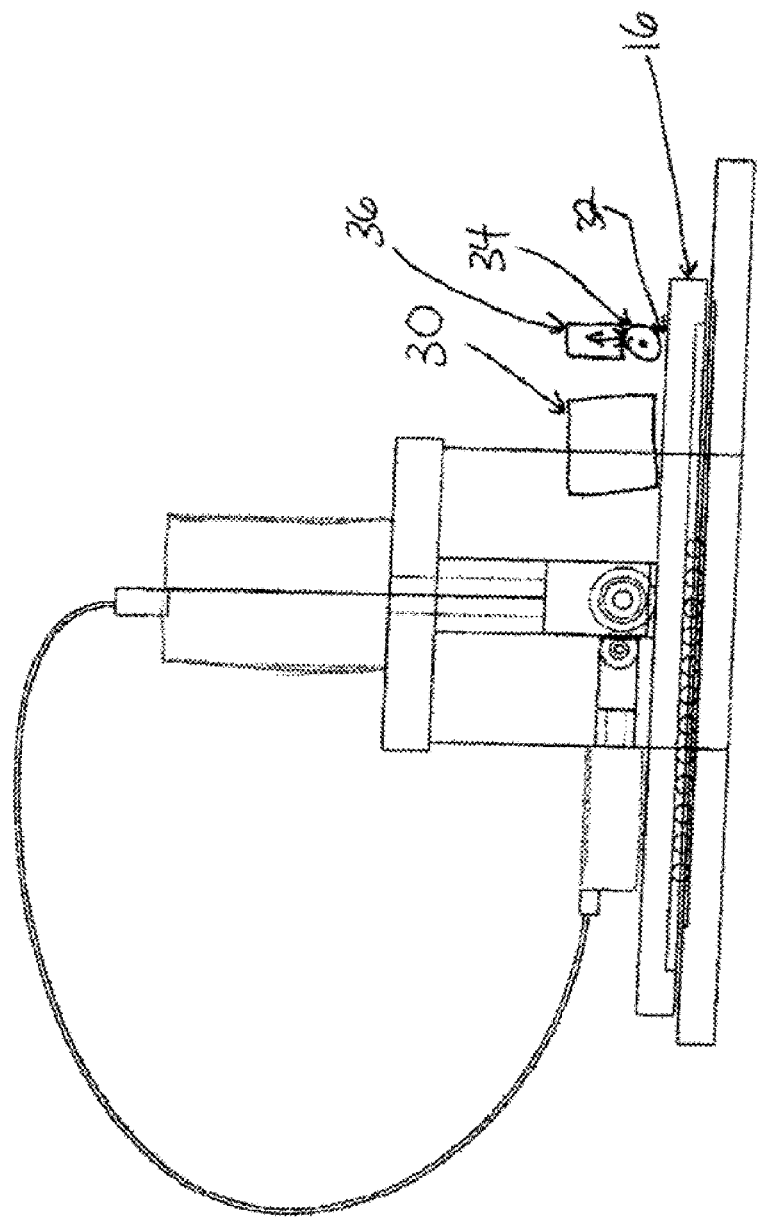
FIG. 8 shows a diagram of a system of some embodiments of the present invention.

Referring to FIG. 8, a system of some embodiments may include curing device 30. In some embodiments, curing device 30 may include a heater, actinic radiation, a pressure applicator, moisture cure, combinations thereof, and the like. In certain embodiments, the system may include third nip point 32. According to some embodiments, third nip point 32 may be formed by third roller 34 and a surface of plate 16. Third roller 34 may be adjusted vertically to a desired position relative to plate 16 to form third nip point 32. In some embodiments, third roller 34 is moved vertically by vertical piston 36. In some embodiments, after filling the cavities at a first nip point, the mold and cover sheet or backing layer which covers the side of the mold that has the cavities thereon/therein can be separated at a downstream nip point to de-wet excess substance from the surface of the mold and leave the liquid composition only in the cavities. In some embodiments after filling the cavities at a first nip point, mold and backing layer can be separated at a downstream nip to separate the particles from the mold and leave the particles on the backing layer. In some embodiments, the surface energy of the cover sheet can be selected based on the properties of the liquid composition to be molded, mold, cavity size, shape, combinations thereof, and their interaction.

Mold

According to some embodiments, a system may include mold 38. Mold 38 may include a plurality of cavities. In some embodiments, the mold cavities may have a substantially predetermined size and shape. In one embodiment, the largest dimension of the cavity is less than about 100 microns. In another embodiment, the largest dimension of the cavity is less than about 90 microns. In another embodiment, the largest dimension of the cavity is less than about 80 microns. In another embodiment, the largest dimension of the cavity is less than about 70 microns. In another embodiment, the largest dimension of the cavity is less than about 60 microns. In another embodiment, the largest dimension of the cavity is less than about 50 microns. In another embodiment, the largest dimension of the cavity is less than about 40 microns. In another embodiment, the largest dimension of the cavity is less than about 30 microns. In another embodiment, the largest dimension of the cavity is less than about 20 microns. In another embodiment, the largest dimension of the cavity is less than about 10 microns. In another embodiment, the largest dimension of the cavity is less than about 9 microns. In another embodiment, the largest dimension of the cavity is less than about 8 microns. In another embodiment, the largest dimension of the cavity is less than about 7 microns. In another embodiment, the largest dimension of the cavity is less than about 6 microns. In another embodiment, the largest dimension of the cavity is less than about 5 microns. In another embodiment, the largest dimension of the cavity is less than about 4 microns. In another embodiment, the largest dimension of the cavity is less than about 3 microns. In another embodiment, the largest dimension of the cavity is less than about 2 microns. In another embodiment, the largest dimension of the cavity is less than about 1 microns.

In another embodiment, the largest dimension of the cavity is less than about 950 nanometers. In another embodiment, the largest dimension of the cavity is less than about 900 nanometers. In another embodiment, the largest dimension of the cavity is less than about 850 nanometers. In another embodiment, the largest dimension of the cavity is less than about 800 nanometers. In another embodiment, the largest dimension of the cavity is less than about 750 nanometers. In another embodiment, the largest dimension of the cavity is less than about 700 nanometers. In another embodiment, the largest dimension of the cavity is less than about 650 nanometers. In another embodiment, the largest dimension of the cavity is less than about 600 nanometers. In another embodiment, the largest dimension of the cavity is less than about 550 nanometers. In another embodiment, the largest dimension of the cavity is less than about 500 nanometers. In another embodiment, the largest dimension of the cavity is less than about 450 nanometers. In another embodiment, the largest dimension of the cavity is less than about 400 nanometers. In another embodiment, the largest dimension of the cavity is less than about 350 nanometers. In another embodiment, the largest dimension of the cavity is less than about 300 nanometers. In another embodiment, the largest dimension of the cavity is less than about 250 nanometers. In another embodiment, the largest dimension of the cavity is less than about 200 nanometers. In another embodiment, the largest dimension of the cavity is less than about 150 nanometers. In another embodiment, the largest dimension of the cavity is less than about 100 nanometers. In another embodiment, the largest dimension of the cavity is less than about 50 nanometers. In another embodiment, the largest dimension of the cavity is less than about 45 nanometers. In another embodiment, the largest dimension of the cavity is less than about 40 nanometers. In another embodiment, the largest dimension of the cavity is less than about 35 nanometers. In another embodiment, the largest dimension of the cavity is less than about 30 nanometers. In another embodiment, the largest dimension of the cavity is less than about 25 nanometers. In another embodiment, the largest dimension of the cavity is less than about 20 nanometers. In another embodiment, the largest dimension of the cavity is less than about 15 nanometers. In another embodiment, the largest dimension of the cavity is less than about 10 nanometers. In another embodiment, the largest dimension of the cavity is less than about 9 nanometers. In another embodiment, the largest dimension of the cavity is less than about 8 nanometers. In another embodiment, the largest dimension of the cavity is less than about 7 nanometers. In another embodiment, the largest dimension of the cavity is less than about 6 nanometers. In another embodiment, the largest dimension of the cavity is less than about 5 nanometers. In another embodiment, the largest dimension of the cavity is less than about 4 nanometers. In another embodiment, the largest dimension of the cavity is less than about 3 nanometers. In another embodiment, the largest dimension of the cavity is less than about 2 nanometers. In another embodiment, the largest dimension of the cavity is less than about 1 nanometer.

Materials that can be useful with and/or as the mold materials used in the present invention include, in some embodiments, substantially solvent resistant, low surface energy polymeric materials. In other embodiments, mold 38 can be or include a solvent resistant elastomer-based material, such as but not limited to a fluoropolymer, a fluorinated elastomer-based material, a fluoropolyether, perfluoropolyether, combinations thereof, or the like. In other embodiments, the mold can have a surface energy below about 25 mN/m. In further embodiments, the mold can have a surface energy below about 20 mN/m. In still further embodiments, the mold can have a surface energy below about 18 mN/m. In yet another embodiment of the present invention, the mold can have a surface energy below about 15 mN/m. In yet another embodiment, the mold can have a surface energy below about 12 mN/m. In another embodiment of the present invention, the mold can have a surface energy below about 10 mN/n.

Representative substantially solvent resistant elastomer-based materials include but are not limited to fluorinated elastomer-based materials. As used herein, the term "substantially solvent resistant" refers to a material, such as an elastomeric material that neither swells nor dissolves beyond a nominal amount in common hydrocarbon-based organic solvents or acidic or basic aqueous solutions. Representative fluorinated elastomer-based materials include but are not limited to fluoropolyether and perfluoropolyether (collectively PFPE) based materials.

The mold materials of the present invention further include photocurable and/or thermal curable components such that the PFPE materials can be cured from a liquid to a solid upon application of a treatment such as actinic radiation or thermal energy. PFPE materials and modified PFPE materials that are applicable to making the molds of the present invention are described herein and it will be appreciated that the materials described herein can be combined in numerous ways to form different mold materials for use in the present invention.

According to some embodiments, hardening or curing of a composition or other material, solution, dispersion, or the like of the present invention includes hardening, such as for example by chemical reaction like a polymerization, phase change, a melting/cooling transition, evaporation, moisture cure, combinations thereof, and the like.

In some embodiments of the present invention the mold and/or substrate materials are preferably flexible, non-toxic, substantially UV transparent, highly gas permeable, highly fluorinated, has a high free volume, tough, have a low surface energy, are highly permeable to oxygen, carbon dioxide, and nitrogen, are substantially resistant to swelling, combinations thereof, and the like. The properties of these materials can be tuned over a wide range through the judicious choice of additives, fillers, reactive co-monomers, and functionalization agents.

In other embodiments, the mold or substrate used in the present invention can includes a material selected from the group including a fluoropolymer, a perfluoropolyether, a fluoroolefin, an acrylate, a silicone such as for example polydimethylsiloxane (PDMS) or fluorinated PDMS, a styrenic, a fluorinated thermoplastic elastomer (TPE), a triazine fluoropolymer, a perfluorocyclobutyl, a fluorinated epoxy, a fluorinated monomer or fluorinated oligomer that can be polymerized or crosslinked, a combination thereof, or the like.

Further, in some embodiments, the materials used herein are selected from highly fluorinated fluoroelastomers, e.g., fluoroelastomers having at least fifty-eight weight percent fluorine, as described in U.S. Pat. No. 6,512,063 to Tang, which is incorporated herein by reference in its entirety. Such fluoroelastomers can be partially fluorinated or perfluorinated and can contain between 25 to 70 weight percent, based on the weight of the fluoroelastomer, of copolymerized units of a first monomer, for example but not limitation, vinylidene fluoride ($VF_2$) or tetrafluoroethylene (TFE). The remaining units of the fluoroelastomers can include one or more additional copolymerized monomers and can be selected from the group of fluorine-containing olefins, fluorine containing vinyl ethers, hydrocarbon olefins, combinations thereof, and the like.

Fluoroelastomers that can be used in the presently disclosed subject matter include, but are not limited to, those having at least 58 wt. % fluorine and having copolymerized units of i) vinylidene fluoride and hexafluoropropylene; ii) vinylidene fluoride, hexafluoropropylene and tetrafluoroethylene; iii) vinylidene fluoride, hexafluoropropylene, tetrafluoroethylene and 4-bromo-3,3,4,4-tetrafluorobutene-1; iv) vinylidene fluoride, hexafluoropropylene, tetrafluoroethylene and 4-iodo-3,3,4,4-tetrafluorobutene-1; v) vinylidene fluoride, perfluoro(methyl vinyl)ether, tetrafluoroethylene and 4-bromo-3,3,4,4-tetrafluorobutene-1; vi) vinylidene fluoride, perfluoro(methyl vinyl)ether, tetrafluoroethylene and 4-iodo-3,3,4,4-tetrafluorobutene-1; vii) vinylidene fluoride, perfluoro(methyl vinyl)ether, tetrafluoroethylene and 1,1,3,3,3-pentafluoropropene; viii) tetrafluoroethylene, perfluoro(methyl vinyl)ether and ethylene; ix) tetrafluoroethylene, perfluoro(methyl vinyl)ether, ethylene and 4-bromo-3,3,4,4-tetrafluorobutene-1; x) tetrafluoroethylene, perfluoro(methyl vinyl)ether, ethylene and 4-iodo-3,3,4,4-tetrafluorobutene-1; xi) tetrafluoroethylene, propylene and vinylidene fluoride; xii) tetrafluoroethylene and perfluoro(methyl vinyl)ether; xiii) tetrafluoroethylene, perfluoro(methyl vinyl)ether and perfluoro(8-cyano-5-methyl-3,6-dioxa-1-octene); xiv) tetrafluoroethylene, perfluoro(methyl vinyl)ether and 4-bromo-3,3,4,4-tetrafluorobutene-1; xv) tetrafluoroethylene, perfluoro(methyl vinyl)ether and 4-iodo-3,3,4,4-tetrafluorobutene-1; and xvi) tetrafluoroethylene, perfluoro(methyl vinyl)ether and perfluoro(2-phenoxypropyl vinyl) ether.

Further, the presently described fluoroelastomers can, in some embodiments, include units of one or more cure site monomers. Examples of suitable cure site monomers include: i) bromine-containing olefins; ii) iodine-containing olefins; iii) bromine-containing vinyl ethers; iv) iodine-containing vinyl ethers; v) fluorine-containing olefins having a nitrile group; vi) fluorine-containing vinyl ethers having a nitrile group; vii) 1,1,3,3,3-pentafluoropropene (2-HPFP), viii) perfluoro(2-phenoxypropyl vinyl)ether; and ix) non-conjugated dienes. Units of cure site monomer, when present in the presently disclosed fluoroelastomers, are typically present at a level of 0.05-110 wt. % (based on the total weight of fluoroelastomer), preferably 0.05-5 wt. % and most preferably between 0.05 and 3 wt. %.

In some embodiments the fluoropolymer or perfluoropolyether mold and/or substrate material is endcapped with an epoxy moiety that can be photocured using a photoacid generator. According to some embodiments, the materials for the mold and/or substrate can include end groups, such as for example: methacrylates; acrylates; styrenics; epoxides; cyclobutanes and other 2+2 cycloadditions; aryl trifluorovinyl ether (TVE); fluoroalkyliodide; cycloaliphatic epoxides; poly(ethylene glycol); diisocyanate; three-armed triol; distyrene; imidazoles; diamine; tetrol; triol; diepoxy; diisocyanate; diurethane dimethacrylate, combinations thereof; and the like.

Further embodiments of molds of the present invention are disclosed in the following references, which are hereby incorporated in their entirety: WO 2007/021762 filed Aug. 9, 2006; WO 2005/084191 filed Feb. 14, 2005; and U.S. 2007-0275193 filed Aug. 11, 2006.

Particles and Films

According to some embodiments, particles and/or patterned films may be formed in cavities 54 of mold 38. In some embodiments, substantially liquid composition 40 may be applied to mold 38, as described herein, to form particles and/or a patterned film. In some embodiments, substantially liquid composition 40 includes a liquid precursor.

In some embodiments, a particle has a size and shape that substantially mimics the size and shape of the cavity of mold 38 in which the particle was formed. In some embodiments, a particle has a substantially predetermined size and shape.

Particles and patterned films of some embodiments of the present invention are, in some embodiments, molded in low surface energy molds, methods, and materials described in the following patent applications: International Patent Application Serial No. PCT/US06/034997, filed Sep. 7, 2006 and published as WO 07/030698; International Patent Application Serial No. PCT/US06/043305 filed Nov. 7, 2006 and published as WO 07/094,829, each of which is incorporated herein by reference in its entirety including all references cited therein.

In some embodiments, each particle of a plurality of particles is configured with a substantially predetermined size and shape. In some embodiments, the manufacturing process may produce particles with inherent variations in shape. In some embodiments, the shape of the particles may vary from the shape of mold 38. In some embodiments, the shape of the particles may vary from the shape of other particles in the plurality of particles. In certain embodiments, the variations of the shape of the particles may be nanoscale variations. In other embodiments, the particles may have substantially identical shapes. In certain embodiments, the particles may have identical shapes.

In some embodiments the material to be molded within cavities 54 of mold 38 in the present invention include biologically active cargo, an element, a molecule, a chemical substance, an agent, a therapeutic agent, a diagnostic agent, a pharmaceutical agent, a drug, a medication, genetic material, a nucleotide sequence, an amino-acid sequence, a ligand, an oligopeptide, a protein, a vaccine, a biologic, DNA, RNA, a cancer treatment, a viral treatment, a bacterial treatment, a fungal treatment, an auto-immune treatment, a psychotherapeutic agent, an imaging agent, a contrast agent, an antisense agent, radiotracers and/or radiopharmaceuticals combinations thereof, and the like. In some embodiments the oligonucleotide includes, but is not limited to an RNA, siRNA, dsRNA, ssRNA, miRNA, rRNA, tRNA, snRNA, sliRNA, DNA, ssDNA, dsDNA, plasmid DNA, or vaccine.

In some embodiments, the material to be molded within cavities 54 of mold 38 include, without limitation, one or more of a polymer, a liquid polymer, a solution, a monomer, a plurality of monomers, a charged monomer, a water soluble monomer, a polymerization initiator, a polymerization catalyst, an inorganic precursor, an organic material, a natural product, a metal precursor, a pharmaceutical agent, a tag a magnetic material, a paramagnetic material, a ligand, a cell penetrating peptide, a porogen, a surfactant, a plurality of immiscible liquids, a solvent, a charged species, combinations thereof, or the like. In some embodiment, the material to be molded in cavities 54 of mold 38 include, but are not limited to, photovoltaic materials, optical materials, transparent materials, translucent materials, opaque materials, conductive materials, combinations thereof, and the like.

In some embodiments, the monomer includes butadienes, styrenes, propene, acrylates, methacrylates, vinyl ketones, vinyl esters, vinyl acetates, vinyl chlorides, vinyl fluorides, vinyl ethers, vinyl pyrrolidone, acrylonitrile, methacrylnitrile, acrylamide, methacryl amide allyl acetates, fumarates, maleates, ethylenes, propylenes, tetrafluoroethylene, ethers, isobutylene, fumaronitrile, vinyl alcohols, acrylic acids, amides, carbohydrates, esters, urethanes, siloxanes, formaldehyde, phenol, urea, melamine, isoprene, isocyanates, epoxides, bisphenol A, alcohols, chlorosilanes, dihalides, dienes, alkyl olefins, ketones, aldehydes, vinylidene chloride, anhydrides, saccharide, acetylenes, naphthalenes, pyridines, lactams, lactones, acetals, thiiranes, episulfide, peptides, derivatives thereof, and combinations thereof.

In yet other embodiments, the polymer includes polyamides, proteins, polyesters, polystyrene, polyethers, polyketones, polysulfones, polyurethanes, polysiloxanes, polysilanes, cellulose, amylose, polyacetals, polyethylene, glycols, poly(acrylate)s, poly(methacrylate)s, poly(vinyl alcohol), poly(vinylidene chloride), poly(vinyl pyrrolidone), poly(vinyl acetate), poly(ethylene glycol), polystyrene, polyisoprene, polyisobutylenes, poly(vinyl chloride), poly(propylene), poly(lactic acid), polyisocyanates, polycarbonates, alkyds, phenolics, epoxy resins, polysulfides, polyimides, liquid crystal polymers, heterocyclic polymers, polypeptides, conducting polymers including polyacetylene, polyquinoline, polyaniline, polypyrrole, polythiophene, and poly(p-phenylene), dendimers, fluoropolymers, derivatives thereof, combinations thereof, and the like.

A co-constituent of the particle, such as a polymer for example, can be cross-linked to varying degrees. Depending upon the amount of cross-linking of the polymer, another co-constituent of the particle, such as a cargo, can be configured to be released from the particle as desired. The cargo can be released with no restraint, controlled release, or can be completely restrained within the particle. In some embodiments, the particle can be functionalized, according to methods and materials disclosed herein, to target a specific biological site, cell, tissue, agent, combinations thereof, or the like. Upon interaction with the targeted biological stimulus, a co-constituent of the particle can be broken down to begin releasing the active co-constituent of the particle. In one example, the polymer can be poly(ethylene glycol) (PEG), which can be cross-linked between about 5% and about 100%. In one embodiment, when the PEG co-constituent is cross-linked about 100%, no cargo leaches out of the particle.

In some embodiments, the particle includes a biodegradable polymer. In other embodiments, the polymer is modified to be a biodegradable polymer, e.g., a poly(ethylene glycol) that is functionalized with a disulfide group. In other embodiments, the polymer is modified to be a biodegradable polymer, e.g., a polyacrylic acid ester that is functionalized with a disulfide group. In some embodiments, the biodegradable polymer includes, without limitation, one or more of a polyester, a polyanhydride, a polyamide, a phosphorous-based polymer, a poly(cyanoacrylate), a polyurethane, a polyorthoester, a polydihydropyran, a polyacetal, combinations thereof, or the like. Further polymers that can be used in particles of the present invention are disclosed in Biodegradable Hydrogels for Drug Delivery, Park K., Shalaby W., Park H., CRC Press, 1993, which is incorporated herein by reference in its entirety.

In some embodiments, the polyester includes, without limitation, one or more of polylactic acid, polyglycolic acid, poly(hydroxybutyrate), poly(ε-caprolactone), poly(β-malic acid), poly(dioxanones), combinations thereof, or the like. In some embodiments, the polyanhydride includes, without limitation, one or more of poly(sebacic acid), poly(adipic acid), poly(terpthalic acid), combinations thereof, or the like. In yet other embodiments, the polyamide includes, without limitation, one or more of poly(imino carbonates), polyaminoacids, combinations thereof, or the like.

In some embodiments, a cargo such as a biologically active cargo can be combined with the particle material. In some embodiments, the cargo is a pharmaceutical agent. The pharmaceutical agent can be, but is not limited to, a drug, a peptide, RNA, RNAi, siRNA, shRNA, DNA, combinations thereof, or the like.

In some embodiments, the matrix composition of the particles is configured to biodegrade in the presence of an intercellular or intracellular stimulus. In some embodiments, the particles are configured to degrade in a reducing environment. In some embodiments, the particles contain crosslinking agents that are configured to degrade in the presence of an external stimulus. In some embodiments, the crosslinking agents are configured to degrade in the presence of a pH condition, a radiation condition, an ionic strength condition, an oxidation condition, a reduction condition, a temperature condition, an alternating magnetic field condition, an alternating electric field condition, combinations thereof, or the like. In some embodiments, the particles contain crosslinking agents that are configured to degrade in the presence of an external stimulus, a targeting ligand, and a therapeutic agent. In some embodiments, the therapeutic agent is a drug or a biologic. In some embodiments the therapeutic agent is DNA, RNA, shRNA, or siRNA.

A further approach is to synthesize a polymer that contains an unstable crosslinker. In some embodiment, this crosslinker can degrade based through hydrolysis, enzymatic cleavage, changes in temperature, pH, or other environments such as oxidation or reduction. Crosslinking groups can include hydrolytically labile carbonate, ester, and phosphazene linkers, lactide or glycolide, and alpha hydroxy acids such as glycolic, succinic, or lactic acid. Cross-linkers of the present invention may also include a degradable region containing one or more groups such as anhydride, an orthoester, and/or a phosphoester. In certain cases the biodegradable region may contain at least one amide functionality. The cross-linker of the present invention may also include an ethylene glycol oligomer, oligo(ethylene glycol), poly(ethylene oxide), poly(vinyl pyrolidone), poly(propylene oxide), poly(ethyloxazoline), or combinations of these substances.

In some embodiments, crosslinkers of the present invention include reduction/oxidation cleavable crosslinkers, such as a disulfide bridges, azo linkages, combinations thereof, or the like. Crosslinkers susceptible to pH changes are also included; these systems can be stable under acidic or basic conditions and start to degrade at blood pH or can be base- or acid-catalyzed.

Hydrolytically degradable crosslinking agents that may be used for forming degradable organic particles include, but are not limited to, poly($\epsilon$-caprolactone)-b-tetraethylene glycol-b-poly($\epsilon$-caprolactone)dimethacrylate, poly($\epsilon$-caprolactone)-b-poly(ethylene glycol)-b-poly($\epsilon$-caprolactone)dimethacrylate, poly(lactic acid)-b-tetraethylene glycol-b-poly(lactic acid)dimethacrylate, poly(lactic acid)-b-poly(ethylene glycol)-b-poly(lactic acid)dimethacrylate, poly(glycolic acid)-b-tetraethylene glycol-b-poly(glycolic acid)dimethacrylate, poly(glycolic acid)-b-poly(ethylene glycol)-b-poly(glycolic acid)dimethacrylate, poly($\epsilon$-caprolactone)-b-tetraethylene glycol-b-poly($\epsilon$-caprolactone)diacrylate, poly($\epsilon$-caprolactone)-b-poly(ethylene glycol)-b-poly($\epsilon$-caprolactone)diacrylate, poly(lactic acid)-b-tetraethylene glycol-b-poly(lactic acid)diacrylate, poly(lactic acid)-b-poly(ethylene glycol)-b-poly(lactic acid) diacrylate, poly(glycolic acid)-b-tetraethylene glycol-b-poly(glycolic acid) diacrylate, poly(glycolic acid)-b-poly(ethylene glycol)-b-poly(glycolic acid)diacrylate, and mixtures thereof. Further crosslinkers that can be used in particles of the present invention are disclosed in Biodegradable Hydrogels for Drug Delivery, Park K., Shalaby W., Park H., CRC Press, 1993, which is incorporated herein by reference in its entirety.

Enzymatically degradable crosslinking agents that may be used for forming degradable organic particle include, but are not limited to, crosslinking agents in which a short sequence of amino acids (for example, 3-5 amino acids) are linked to two methacrylate or acrylate groups. Examples of enzymatically degradable crosslinking agents include, but are not limited to, alanine-proline-glycine-leucine-poly(ethylene glycol)-alanine-proline-glycine-leucine)-diacrylate, alanine-proline-glycine-leucine-diacrylate, alanine-proline-glycine-leucine-poly(ethylene glycol)-alanine-proline-glycine-leucine)-dimethylacrylate-, and alanine-proline-glycine-leucine-dimethylacrylate, combinations thereof, and the like. Other enzymatically degradable crosslinking agents are disclosed in West & Hubbell (1999) Macromolecules 32(1):241-4, which is incorporated herein by reference in its entirety. Other enzymatically cleaved crosslinkers contain azobonds. In some embodiments a hydrolytically labile crosslinker can be fabricated for use in the particles and structured surfaces of the present invention. An example of a hydrolytically labile crosslinker includes poly($\epsilon$-caprolactone)-b-tetraethylene glycol-b-poly($\epsilon$-caprolactone)dimethacrylate.

In some embodiments, the particle includes a therapeutic or diagnostic agent coupled with the particle. The therapeutic or diagnostic agent can be physically coupled or chemically coupled with the particle, encompassed within the particle, at least partially encompassed within the particle, coupled to the exterior of the particle, entangled within the matrix of the particle, crosslinked into the particle, covalently bonded to the matrix of the particle, held in the particle by hydrophobic/hydrophilic forces, combinations thereof, and the like. The therapeutic agent can be a drug, a biologic, a ligand, an oligopeptide, a cancer treating agent, a viral treating agent, a bacterial treating agent, a fungal treating agent, combinations thereof, or the like.

According to other embodiments, one or more other drugs can be included with the particles and structured surfaces of the presently disclosed subject matter and can be found in Physicians' Desk Reference, Thomson Healthcare, 61$^{st}$ ed. (2007), which is incorporated herein by reference in its entirety.

Films

According to some embodiments, a system of the present invention includes substrate 42, as shown in FIG. 4. In some embodiments, substrate 42 may include the materials described herein for mold 38 of the present invention. In some embodiments, substrate 42 is flexible. In other embodiments, substrate 42 is rigid. In some embodiments, substrate 42 may include at least one of a wafer, glass, plastic, polycarbonate, PEN, or PET. In some embodiments, substrate 42 is sacrificial. In some embodiment the substrate of the present invention includes substrates that have a selected affinity or lack of affinity for materials to be molded within the cavities of the present invention. In some embodiments, the substrate includes a surface energy below about 25 mN/m.

Further embodiments of substrates and molds of the present invention are disclosed in the following references, which are hereby incorporated in their entirety: WO 2007/021762 filed Aug. 9, 2006; WO 2005/084191 filed Feb. 14, 2005; and U.S. 2007-0275193 filed Aug. 11, 2006.

Method of Forming Particles

In some embodiments, a system of the present invention is used to form particles of a substantially predetermined size and shape as described herein.

In some embodiments, a method of forming particles includes applying substantially liquid composition 40, as described herein, to mold 38. As described herein, mold 38 of the present invention may define a plurality of cavities. In some embodiments, substantially liquid composition 40 may be applied to mold 38 before mold 38 reaches a nip point. In certain embodiments, substantially liquid composition 40 may be applied between mold 38 and substrate 42.

In some embodiments, mold 38 is nipped between roller 10 and surface 11. In some embodiments mold 38 is nipped at the nip point 14, 18. According to certain embodiments, mold 38 may be nipped between roller 10 and surface 11 such that substantially liquid composition 40 enters cavities 54 of mold 38. The some embodiments, nipping mold 38 between roller 10 and surface 11 includes urging surface 11 towards roller 10. In other embodiments, nipping mold 38 between roller 10 and surface 11 includes urging roller 10 towards surface 11. A predetermined amount of pressure may be applied to mold 38 at nip point 14, 18.

In some embodiments, substrate 42 and mold 38 are nipped by roller 10 and surface 11. In some embodiments, surface 11 is the surface of second roller 12. In some embodiments, surface 11 is the surface of plate 16.

A variety of system parameters may be selected for a desired application. Significant to this art, pressures are utilized to bring components into predetermined proximities and contact times and the flow control of the liquid compositions is principally achieved by capillary force and material surface properties not hydraulic pressures. Parameters may be selected based on the desired contact area of mold 38 and/or substrate 42 at the nip point, the desired contact time at the nip point, thickness of mold 38, the flexibility of the components in the system, the desired speed at which the system is to be run, the angles of the substrate and mold upon entering the nip point, combinations thereof, and the like. Referring to FIGS. 9A-9C, the roller materials and the pressure, which may be controlled by the position of rollers 10, 12, at nip point 14, 18 may have an impact on the conditions at nip point 14, 18 for forming and controlling proximities between the molds and cover films. As shown in FIG. 9A, soft roller 10 and/or a high pressure at nip point 14 may result in a larger contact area through nip point 14. In contrast, FIG. 9B shows that harder roller 10 and/or a lower pressure at nip point 14 may result in a smaller contact area through nip point 14. The variation in contact areas based on roller hardness and/or pressure, which may be adjusted by the position of rollers 10, 12, may impact the amount of time and the pressure at which mold 38 and substrate are nipped between rollers 10, 12. As shown in FIG. 9C, nip point 18 formed by roller 10 and the surface of plate 16 may result in a flat interface rather than a curved interface shown in FIGS. 9A and 9B. Nip point 18 may be formed with any roller hardness, and may be suitable for nipping fragile substrates such as wafers or glass. In some embodiments, the footprint between the softer roller and a harder surface generates zones of alternative speeds from deformation of the softer roller. The deformation of the footprint can be adjusted based on pressures, roller hardness, and the like to generate a desired footprint for a particular application.

According to some embodiments, substantially liquid composition 40 may be hardened in cavities 54 of mold 38 to form a particle in each cavity. In some embodiments, the particles are hardened by curing. The curing may be passive or active curing. In certain embodiments, the particles may be hardened by heat, radiation, pressure, moisture, combinations thereof, or the like. According to certain embodiments, heat is supplied through rollers 10, 12 or plates.

In certain embodiments, the particle has a size and shape that substantially mimics the size and shape of mold 38. In some embodiments, the particle is harvested from mold 38.

Figure 10:
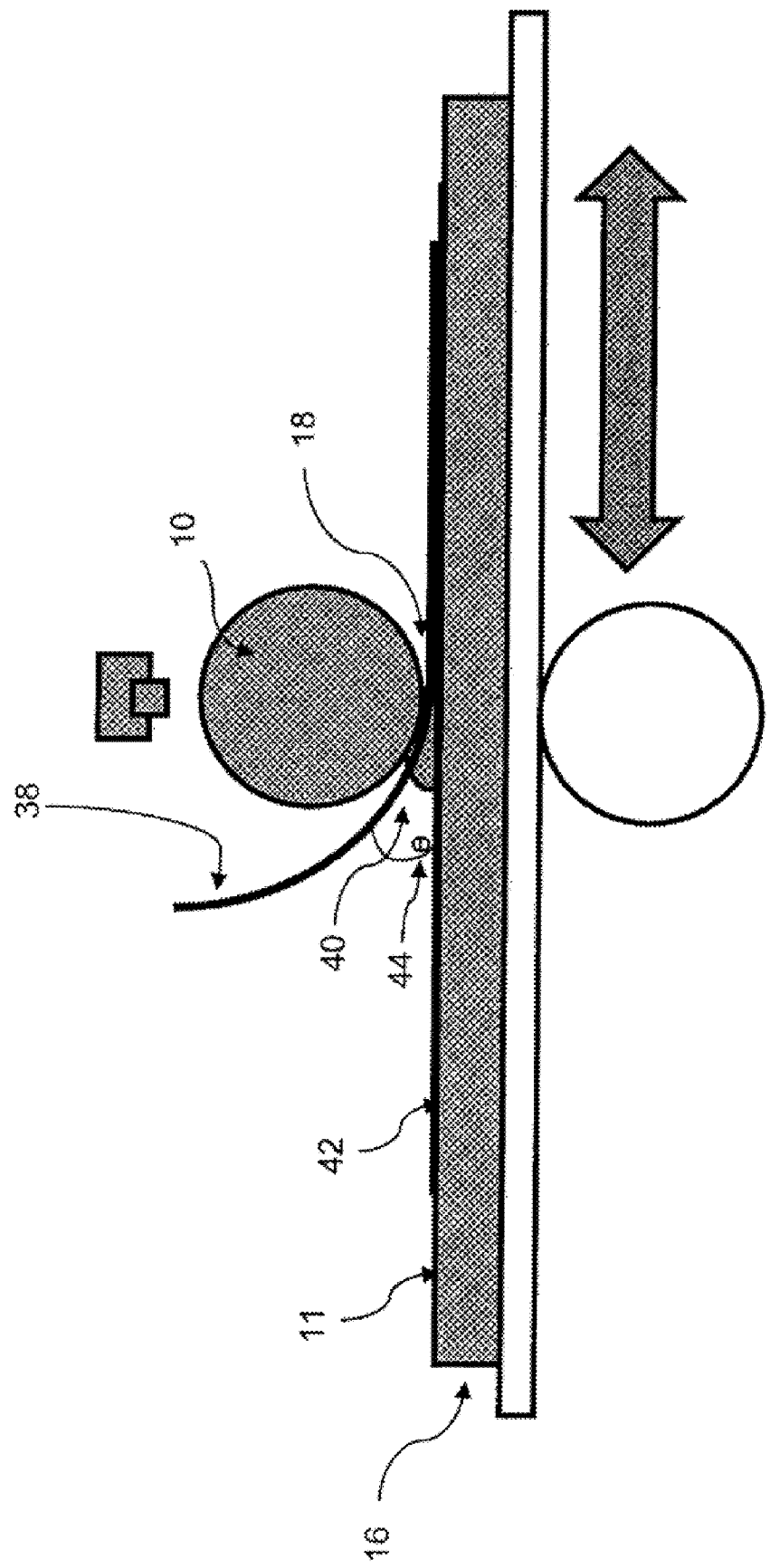
FIG. 10 shows a configuration of a substrate and a mold nipped between the surface of a roller and a surface of a plate.

Referring to FIG. 10, in some embodiments mold 38 and substrate 42 may be nipped between the surface of plate 16 and roller 10. In some embodiments, substrate 42 and mold 38 are nipped between roller 10 and plate 16 to laminate substrate 42 to mold 38. According to some embodiments, mold 38 may approach nip point 18 at predetermined angle 44 relative to the surface of plate 16. In certain embodiments, substrate 42 may approach nip point 18 horizontally along plate 16. Before nipping, substantially liquid composition 40 may be applied to mold 38 and/or substrate 42. Substantially liquid composition 40 may be applied between roller 10 and substrate 42. In some embodiments, entry of the substantially liquid composition 40 into mold 38 cavities is accelerated and/or urged by roller 10 and the surface of plate 16. In some embodiments, a predetermined amount of pressure is applied at nip point 18 to accelerate and/or urge substantially liquid composition 40 into mold 38 cavities. In some embodiments, substrate 42 is laminated to mold 38 with mold 38 cavities containing substantially liquid composition 40. In some embodiments, composition 40 in mold 38 cavities is trapped by substrate 42. According to certain embodiments, the system of FIG. 10 is suitable for volatile substantially liquid compositions 40. In some embodiments, substantially liquid composition 40 is hardened in cavities 54 of mold 38. According to some embodiments, after substantially liquid composition 40 is hardened in mold 38 cavities, the particles may be harvested by stripping mold 38 from substrate 42. In other embodiments, the particles may be harvested by stripping substrate 42 from mold 38.

Figure 11:
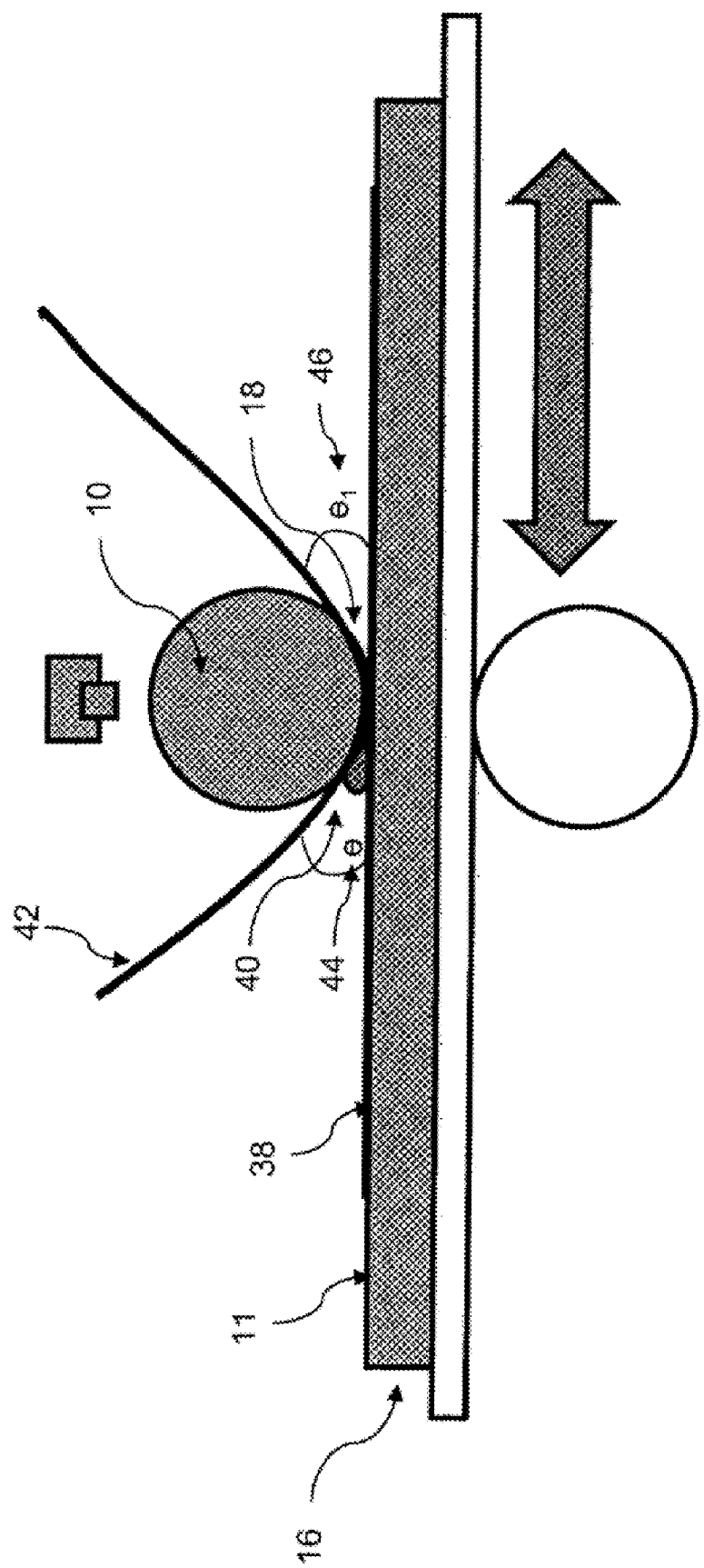
FIG. 11 shows a configuration of a substrate and a mold nipped between the surface of a roller and a surface of a plate.

Referring to FIG. 11, in some embodiments mold 38 and substrate 42 may be nipped between the surface of plate 16 and roller 10. In some embodiments, substrate 42 may approach nip point 18 at predetermined angle 44. Substrate 42 may include, for example, PET. Substrate 42 may include other high surface energy materials. According to certain embodiments, mold 38 may approach nip point 18 horizontally along plate 16. Before nipping, substantially liquid composition 40 may be applied to mold 38 and/or substrate 42. Substantially liquid composition 40 may be applied between mold 38 and substrate 42. In some embodiments, entry of substantially liquid composition 40 into mold 38 cavities is accelerated by roller 10 and the surface of plate 16. In some embodiments, a predetermined amount of pressure is applied at nip point 18 to accelerate entry and/or urge substantially liquid composition 40 into mold 38 cavities. Once substantially liquid composition 40 enters mold 38 cavities, composition 40 may be hardened to form particles. According to some embodiments, substrate 42 moves away from nip point 18 at predetermined angle 46 relative to the surface of plate 16. Mold 38 may move away from nip point 18 horizontally along the surface of plate 16. In certain embodiments, substrate 42 is separated from mold 38 as substrate 42 and mold 38 move away from nip point 18. In some embodiments, the particles adhere to substrate 42. In certain embodiments, the particles adhere to substrate 42 and are removed from mold 38 cavities when substrate 42 is separated from mold 38. According to some embodiments, the adherence of the particles to substrate 42 is related to angle 46 relative to the surface of plate 16 at which substrate 42 moves away from nip point 18.

Figure 12:
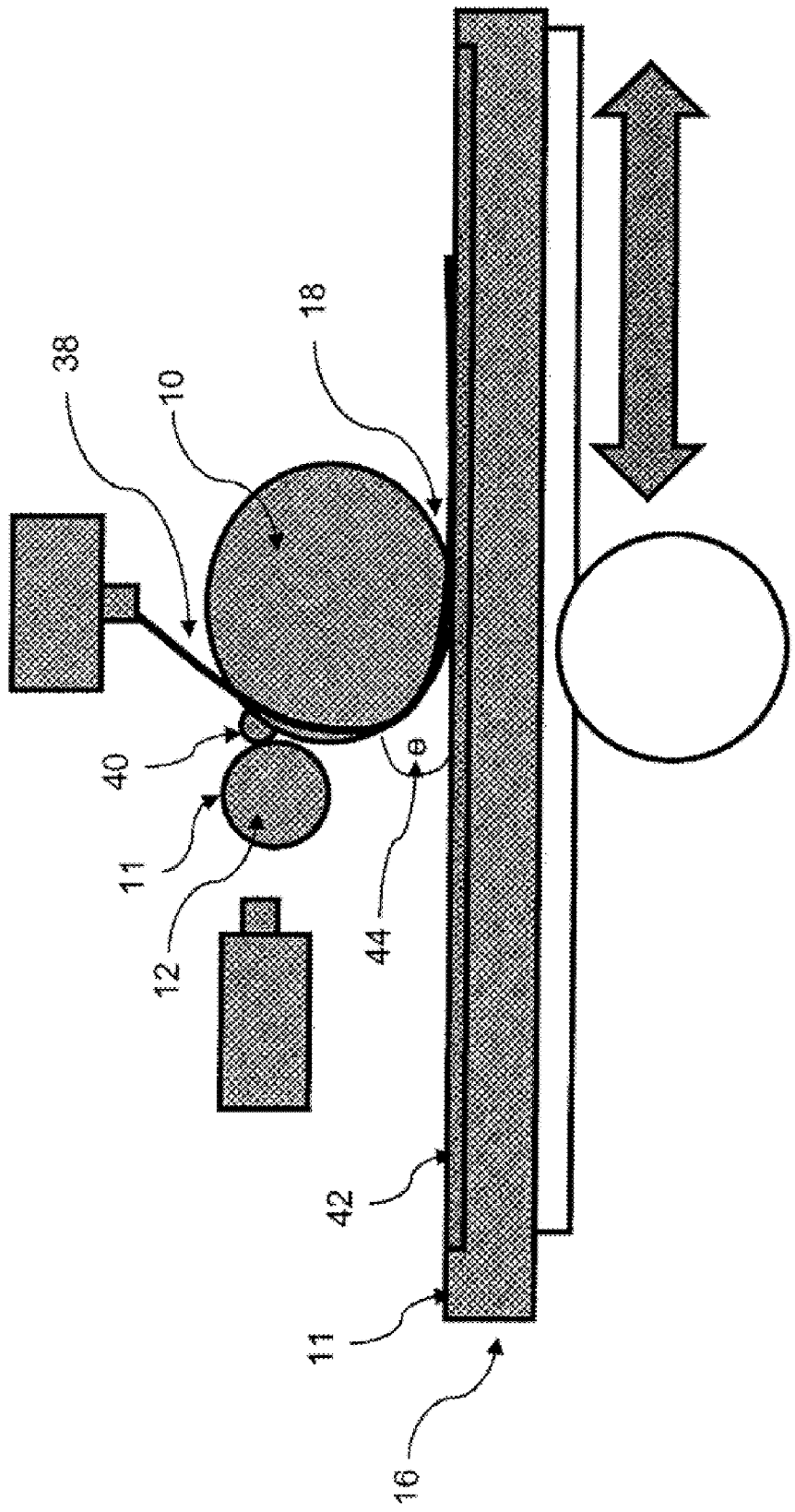
FIG. 12 shows a configuration of a system with more than one nip point.

Referring to FIG. 12, in some embodiments a system includes multiple nip points, such as first nip point 14 and second nip point 18. In some embodiments, substantially liquid composition 40 is applied to mold 38. Composition 40 may be applied to mold 38 prior to mold 38 reaching first nip point 14. In some embodiments, first nip point 14 may be formed by roller 10 and the surface of second roller 12. Rollers 10, 12 may be positioned to form desired nip point 14. In some embodiments, second roller 12 is coated in a substance to which substantially liquid composition 40 does not adhere. In some embodiments, second roller 12 is covered in a layer of PE or PTFE. Rollers 10, 12 may turn at a predetermined rate to push mold 38 through nip point 14. Composition 40 may be accelerated into mold 38 cavities by roller 10 and second roller 12 at first nip point 14. In some embodiments, a predetermined amount of pressure is applied at nip point 14 to accelerate substantially liquid composition 40 into mold 38 cavities. In some embodiments, mold 38 is nipped by roller 10 and a second surface at second nip point 18. In certain embodiments, the second surface is the surface of plate 16. Roller 10 and plate 16 may be positioned to form desired nip point 18. In certain embodiments, mold 38 and substrate 42 are nipped between roller 10 and the surface of plate 16 at second nip point 18. In some embodiments, mold 38 approaches second nip point 18 at predetermined angle 44 relative to the surface of plate 16. According to some embodiments, mold 38 cavities contain substantially liquid composition 40 prior to reaching second nip point 18. Substrate 42 may approach second nip point 18 horizontally along the surface of plate 16. In some embodiments, substrate 42 is laminated to mold 38 at second nip point 18. In some embodiments, a predetermined amount of pressure is applied to mold 38 and substrate 42 at second nip point 18 to laminate substrate 42 to mold 38. The liquid composition may be hardened in mold 38 cavities to form particles. In some embodiments, the particles may be captured in mold 38 cavities by substrate 42. In some embodiments, such a system is suitable for volatile liquids.

Method of Harvesting Particles

In some embodiments, systems and methods of the present invention harvest particles. Referring to FIG. 13A, in some embodiments laminate 52 is formed from base 56 which is treated with soluble substance 58. In certain embodiments, base 56 may include polyethylene terephthalate (PET). According to some embodiments, soluble substance 58 includes polyvinyl pyrrolidone (PVP). Referring the FIG. 13B, in certain embodiments particle 60 as described herein is adhered to soluble substance 58. Referring to FIG. 13C, in one embodiment particle 60, contained within cavity 54 of fluoropolymer mold 38, may be engaged with soluble substance 58 to adhere particle 60 to soluble substance 58 on base 56 and thereby remove particle 60 from cavity 54.

Figure 14:
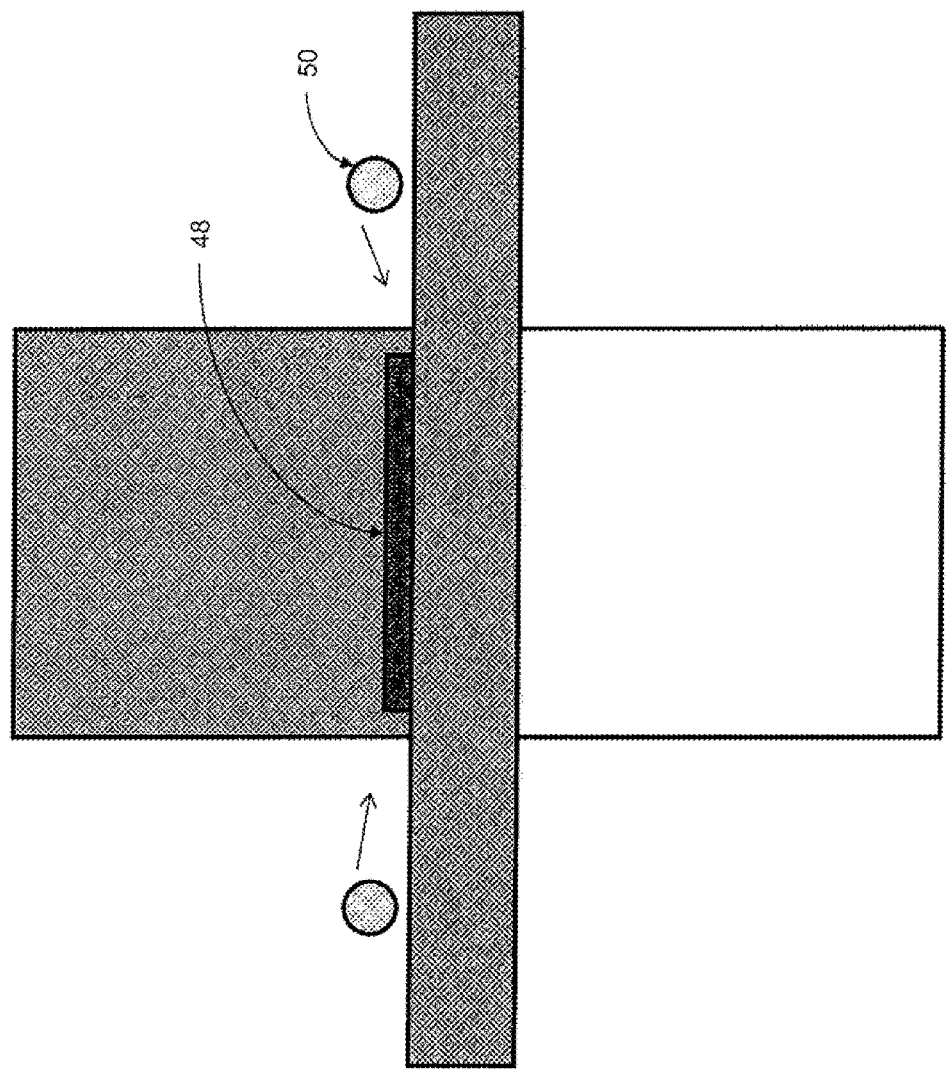
FIG. 14 shows a configuration of a system in which a solvent is applied to a laminate proximate the nip point.
Figure 15:
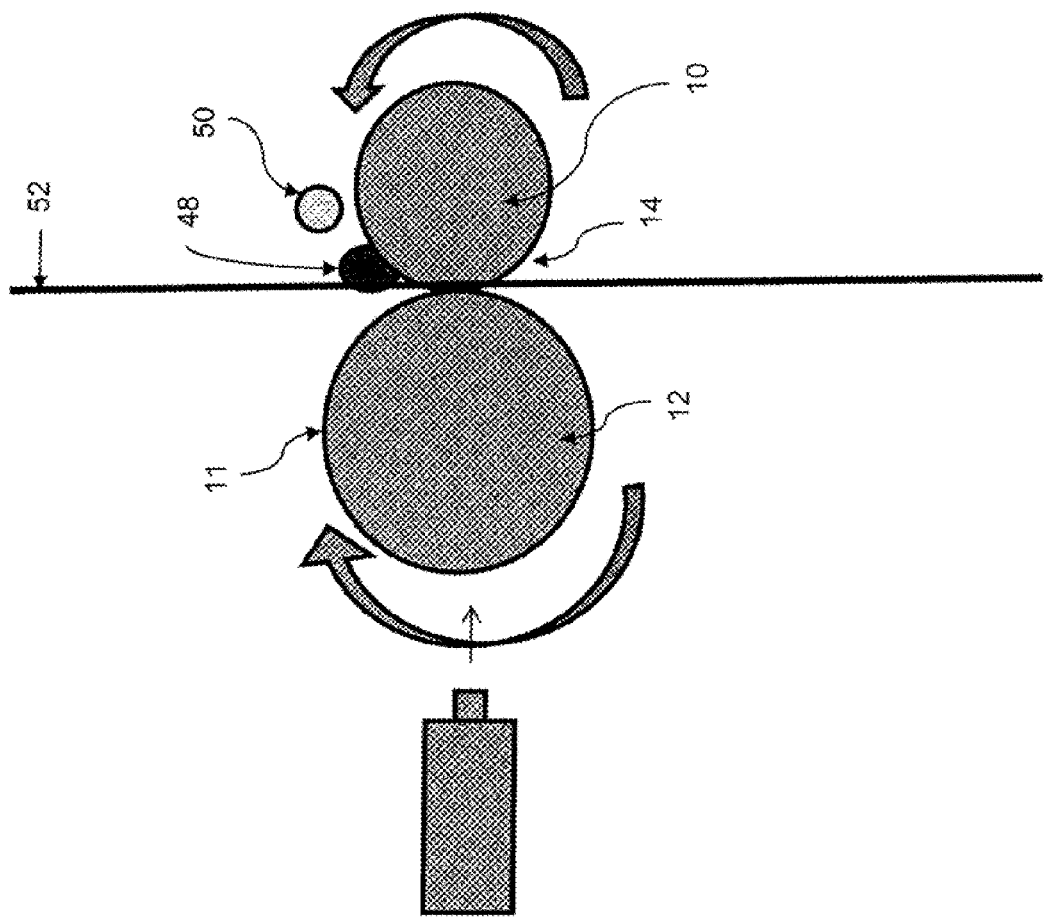
FIG. 15 shows a configuration of a system in which a solvent is applied to a laminate proximate the nip point.

Referring to FIGS. 14 and 15, in certain embodiments a solvent is applied to laminate 52 proximate nip point 14, 18. In some embodiments, solvent 48 is contained within a boundary of laminate 52. Solvent 48 may be contained within the boundary of laminate 52 by applying air stream 50 toward solvent 48.

In some embodiments, solvent 48 is selected to dissolve soluble substance 58. In some embodiments, soluble substance 58 is selected according to a composition of particle 60 and what will bind or have an affinity for particle 60. In some embodiments, solvent 48 is water. Solvent 48 is capable of dissolving soluble substance 58. In some embodiments, solvent 48 dissolves soluble substance 58 and releases particle 60 from laminate 52 into a solution of soluble substance 58 and solvent 48. In some embodiments, the particle 60 forms a dispersion in a solution of soluble substance 58 and solvent 48. In certain embodiments, the solution is collected.

Referring to FIG. 15, in some embodiments laminate 52 with base layer 56, soluble substance 58, and adhered particle 60 is nipped between roller 10 and surface 11 of second roller 12. In some embodiments, roller 10 includes an elastic material, e.g., rubber. In some embodiments, second roller 12 includes an inelastic material, e.g., stainless steel. In certain embodiments, roller 10 and second roller 12 are positioned relative to each other to form desired nip point 14. Roller 10 and second roller 12 may turn against each other at a desired speed to move laminate 52 through nip point 14. According to certain embodiments, solvent 48 such as water is applied to laminate 52 proximate nip point 14. Air jets 50 may be applied to solvent 48 to contain solvent 48 within the boundary of laminate 52. Solvent 48 may dissolve soluble substance 58 on laminate 52 to release particle 60 from laminate 52 into absolution of soluble substance 58 and solvent 48. In some embodiments, the particle 60 forms a dispersion of particles in a solution of soluble substance 58 and solvent 48. Base layer 56 may proceed through and away from nip point 14.

In some embodiments, particles 60 are harvested from mold 38 by a harvesting nip. A harvesting nip may be configured and dimensioned to receive mold 38 with filled cavities 54 and nip mold 38 against a harvesting layer or substrate 42 such that the composition in cavities 54 of mold 38 is released from cavity 54 and remains on the harvesting layer or substrate 42. In some embodiments, the substance released from cavity 54 into a solution is then collected.

Referring again to FIG. 8, particles 60 may be harvested by nipping mold 38 and substrate 42 to release particles 60 onto substrate 42. In some embodiments, substrate 42 and mold 38 are nipped by roller 34 and plate 16. In certain embodiments, the mold cavities 54 contain particles 60. Roller 10 and plate 16 may move to guide mold 38 and substrate 42 to pass through nip point 32 at a desired speed. In some embodiments, mold 38 is separated from substrate 42 after passing through nip point 32. In certain embodiments, mold 38 moves away from nip point 32 at a predetermined angle relative to the surface of plate 16. In some embodiments, 42 substrate moves away from nip point 32 horizontally along the surface of plate 16. According to certain embodiments, particles 60 may be released from mold 38 on substrate 42 after nip point 32 as mold 38 is separated from substrate 42. In some embodiments, the release of particles 60 onto substrate 42 is dependent on the predetermined angle at which mold 38 moves away from nip point 32.

Method of Forming Patterned Films

In some embodiments, patterned films can be fabricated with the system of the present invention. Patterned films can be made by applying substantially liquid composition 40 to mold 38 and laminating substantially liquid composition 40 between mold 38 and a film in a nip roller. Nipping this laminate accelerates entry of substantially liquid composition 40 into cavities 54 of mold 38 while excess composition 40 remains between the film and mold 38. In some embodiments the combined mold 38, composition 40, and film is treated to harden or cure substantially liquid composition 40 into a patterned film. Accordingly, after hardening, mold 38 is separated from the film and the patterned film, and the patterned film includes the hardened composition that both entered cavities 54 of mold 38 and the excess that remained between the film and mold 38. The portion of the hardened composition that entered cavities 54 of the mold 38 results in structures having substantially the same shape and size of cavities 54. In embodiments, the pressures of rollers 10, 12, distances between rollers 10, 12 and/or surfaces 11, quantity of materials, temperatures, speeds, time, and other parameters of the present invention can be adjusted to result in a desired thickness of patterned film, materials of the patterned films, or the like.

In other embodiments, after the film is laminated to mold 38 with composition 40 therebetween, the film can be removed to yield mold cavities 54 filled with composition and virtually no or no composition on the surface of mold 38 between cavities 54. Next, a second film is laminated onto mold 38. After laminating the second film onto mold 38, the combination is treated to harden or cure composition 40 into solid structures on a surface of the patterned film.

In a preferred embodiment the materials used to fabricate the patterned films include optical materials, such as optical polymers, conducting polymers, organic optoelectronic materials, and the like. The optical polymers include properties such as, but not limited to, high optical clarity, resistance to yellowing, extremely low outgassing, wide range of refractive index, resistance to high radiation flux, very low to very high temperature service ranges, low trace ionics for sensitive electro-optics, the ability to withstand high strain without delamination, combinations thereof, and the like.

The present invention is not to be limited in scope by the specific embodiments disclosed herein which are intended as illustrations of a few aspects of the invention and any embodiments which are functionally equivalent are within the scope of this invention. Indeed, various modifications of the invention in addition to those shown and described herein will become apparent to those skilled in the art and are intended to fall within the appended claims.

Each reference identified herein is hereby incorporated by reference as if set forth in its entirety.

We claim:

1. A method of forming nanoparticles, comprising
   (a) applying a substantially liquid composition to a mold, wherein the mold comprises a polymer and defines a plurality of cavities each having a broadest cross-sectional dimension of less than about 100 micrometers;
   (b) passing the mold through a nip point such that the substantially liquid composition enters the cavities of the mold, wherein passing the mold through the nip point comprises nipping the substantially liquid composition between a cover sheet and the mold;
   (c) removing the cover sheet from the mold such that the substantially liquid composition not in the cavities of the mold remains adhered to the cover sheet, the land area of the mold between the cavities is substantially free from the substantially liquid composition, and the cavities of the mold remain filled with the substantially liquid composition; and
   (d) hardening the substantially liquid composition in the cavities of the mold to form a particle within each cavity, wherein the particle has a size and shape that substantially mimics the size and shape of the cavity of the mold.

2. The method of claim 1, further comprising, after hardening, harvesting the particles from the mold.

3. The method of claim 1, further comprising, before hardening, nipping the mold with a substrate to laminate the substrate to the mold.

4. The method of claim 3, further comprising after nipping the mold with the substrate, hardening the substantially liquid composition and harvesting the particle from the mold, wherein the harvesting includes separating the substrate from the mold such that the substrate moves away from the mold with the particles disposed on the substrate.

5. The method of claim 4, wherein the substrate is removed from the mold at a predetermined angle.

6. The method of claim 1, wherein the polymer mold comprises a fluoropolymer.

7. The method of claim 1, wherein the polymer mold comprises a fluoropolyether.

8. The method of claim 1, further comprising, after removing the cover sheet, contacting the mold with a harvest sheet.

9. The method of claim 8, wherein the harvest sheet comprises an affinity for the particles in the cavities of the mold.

10. The method of claim 8, wherein the harvest sheet comprises a soluble substance having an affinity for the particles in the cavities of the mold.

11. The method of claim 10, further comprising removing the harvest sheet from the mold such that the particles are released from the cavities of the mold and remain in contact with the soluble substance of the harvest sheet.

12. The method of claim 11, further comprising releasing the particles from the harvest sheet by treating the harvest sheet with a solvent selected to dissolve the soluble substance.

13. The method of claim 12, further comprising forming a dispersion with the particles in a solution of the solvent and the soluble substance.

14. The method of claim 1, wherein the cover sheet comprises a closed loop.

15. The method of claim 1, wherein the cover sheet is disposed about a roller.

16. The method of claim 1, wherein each of the cavities of the plurality of cavities has a largest dimension of less than about 10 micrometers.

17. The method of claim 1, wherein each of the cavities of the plurality of cavities has a largest dimension of less than about 1 micrometer.

* * * * *

UNITED STATES PATENT AND TRADEMARK OFFICE
CERTIFICATE OF CORRECTION

PATENT NO.       : 7,976,759 B2  
APPLICATION NO.  : 12/250461  
DATED            : July 12, 2011  
INVENTOR(S)      : Robert Henn et al.

Page 1 of 1

It is certified that error appears in the above-identified patent and that said Letters Patent is hereby corrected as shown below:

Title page, item "(75) Inventors," add the following inventors:

-- Jason Rolland, Belmont, MA (US);
   Robert Praino, Westwood, MA (US) --

Signed and Sealed this
Seventeenth Day of December, 2013

Margaret A. Focarino
*Commissioner for Patents of the United States Patent and Trademark Office*